United States Patent
Bryars

[19]
[11] Patent Number: 5,986,815
[45] Date of Patent: Nov. 16, 1999

[54] SYSTEMS, METHODS AND APPARATUS FOR IMPROVING THE CONTRAST RATIO IN REFLECTIVE IMAGING SYSTEMS UTILIZING COLOR SPLITTERS

[75] Inventor: Brett Bryars, Santa Rosa, Calif.

[73] Assignee: Optical Coating Laboratory, Inc., Santa Rosa, Calif.

[21] Appl. No.: 09/079,891

[22] Filed: May 15, 1998

[51] Int. Cl.[6] .................................................. G02B 27/14
[52] U.S. Cl. .......................... 359/634; 359/256; 359/637; 359/494; 349/5; 349/8; 349/9; 353/31; 353/33
[58] Field of Search ........................... 359/634, 637, 359/638, 494, 495, 250, 256, 259; 349/5, 8, 9, 18, 119; 353/31, 33, 34

[56] References Cited

U.S. PATENT DOCUMENTS

| | | | |
|---|---|---|---|
| 4,408,839 | 10/1983 | Wiener-Avnear | 350/347 |
| 4,583,825 | 4/1986 | Buzak | 350/335 |
| 5,005,952 | 4/1991 | Clark et al. | 350/335 |
| 5,044,732 | 9/1991 | Kimura et al. | 359/53 |
| 5,115,305 | 5/1992 | Baur et al. | 358/60 |
| 5,124,818 | 6/1992 | Conner et al. | 359/53 |
| 5,124,841 | 6/1992 | Oishi | 359/487 |
| 5,130,826 | 7/1992 | Takanashi et al. | 359/72 |
| 5,134,507 | 7/1992 | Ishii | 359/94 |
| 5,150,237 | 9/1992 | Iimura et al. | 359/73 |
| 5,157,523 | 10/1992 | Yamagishi et al. | 359/41 |
| 5,184,237 | 2/1993 | Iimura et al. | 359/63 |
| 5,231,522 | 7/1993 | Sumiyoshi | 359/53 |
| 5,245,451 | 9/1993 | Wu et al. | 359/55 |
| 5,250,214 | 10/1993 | Kanemoto et al. | 252/299.01 |
| 5,251,068 | 10/1993 | Oshima et al. | 359/634 |
| 5,264,951 | 11/1993 | Takanashi et al. | 359/53 |
| 5,267,029 | 11/1993 | Kurematsu et al. | 358/60 |
| 5,270,804 | 12/1993 | Lach | 358/62 |
| 5,285,268 | 2/1994 | Nakagaki et al. | 348/760 |
| 5,305,146 | 4/1994 | Nakagaki et al. | 359/634 |
| 5,325,137 | 6/1994 | Konno et al. | 353/63 |
| 5,327,270 | 7/1994 | Miyatake | 359/63 |
| 5,347,382 | 9/1994 | Rumbaugh | 359/84 |
| 5,379,135 | 1/1995 | Nakagaki et al. | 359/40 |
| 5,380,459 | 1/1995 | Kanemoto et al. | 252/299.01 |
| 5,387,991 | 2/1995 | Mitsutake et al. | 359/93 |
| 5,398,081 | 3/1995 | Jones | 348/742 |
| 5,400,179 | 3/1995 | Ito | 359/588 |
| 5,440,414 | 8/1995 | Kersey et al. | 359/250 |
| 5,453,859 | 9/1995 | Sannohe et al. | 359/63 |
| 5,459,593 | 10/1995 | Ootaki | 359/40 |
| 5,462,621 | 10/1995 | Ishii | 156/229 |
| 5,576,854 | 11/1996 | Schmidt et al. | 359/40 |
| 5,579,138 | 11/1996 | Sannohe et al. | 359/63 |
| 5,579,159 | 11/1996 | Ito | 359/487 |
| 5,594,591 | 1/1997 | Yamamoto et al. | 349/5 |
| 5,621,486 | 4/1997 | Doany et al. | 348/756 |
| 5,625,491 | 4/1997 | von Gunten et al. | 359/487 |
| 5,644,432 | 7/1997 | Doany | 359/634 |
| 5,658,060 | 8/1997 | Dove | 353/33 |
| 5,676,854 | 10/1997 | Inui et al. | 216/24 |
| 5,777,789 | 7/1998 | Chiu et al. | 359/494 |
| 5,777,796 | 7/1998 | Burstyn | 359/634 |

*Primary Examiner*—Loha Ben
*Attorney, Agent, or Firm*—Workman, Nydegger & Seeley

[57] ABSTRACT

Methods and apparatus for enhancing the performance of reflective LCD systems. The high-contrast color-splitting prism system utilizes a "double-pass" prism assembly. Polarized light enters the prism assembly, is color-split and is emitted as separate colors to reflective imagers which reflect each color in accord with a desired image. The reflected light is passed, once again, through the prism assembly where the separate colors converge and the convergent light is emitted to a projection lens for display of the image on a screen. At least one zero-incidence waveplate compensator is positioned between one reflective imager and the prism assembly. The waveplate compensator effectively decreases the unwanted polarized light entering the prism assembly for the second pass-through, thereby increases the polarization purity of the light that is emitted from the prism assembly to the projection lens to yield a high-contrast projection image.

70 Claims, 23 Drawing Sheets

SYSTEMS, METHODS AND APPARATUS FOR IMPROVING THE CONTRAST RATIO IN REFLECTIVE IMAGING SYSTEMS UTILIZING COLOR SPLITTERS

BACKGROUND OF THE INVENTION

1. The Field of the Invention

The present invention is directed to systems, methods and apparatus for achieving enhanced contrast in reflective imaging systems, such as those utilizing reflective liquid crystal display imagers and color splitting devices, such as Philips prisms. More particularly, the present invention is directed to systems, methods and apparatus for correcting undesired depolarization by color splitting devices. The invention maximizes the transmission of light polarized in a certain direction while minimizing the transmission of light polarized in another direction, thereby achieving a high contrast ratio which significantly improves the final image quality.

2. The Relevant Technology

Liquid crystal displays are commonly used in rear projection imaging systems. A reflecting type of liquid crystal panel comprises an array of pixels, which when activated works by reflecting incident light while simultaneously rotating the polarization vector of the light by 90°, typically when a voltage or signal is applied to an individual pixel. Thus the signal or image information is contained in the light which is of a particular polarization. If the liquid crystal imager is not activated, then those particular pixels of the liquid crystal imager are in the "off" state, and the light which is reflected from them will have no rotation of the polarization state. The signals from these "off" pixels should correspond to dark spots in the final image. One aspect of the quality of an image in such a system is measured through a parameter known as the contrast ratio, which is defined as the ratio of the light transmitted through the system in the on state divided by the amount of light transmitted in the "off" state. The higher the contrast ratio, the better the overall quality of the image. A display should project a bright image relative to the ambient lighting conditions. High brightness of the "on" pixels enhances the contrast ratio and allows the projector to be used in a broader range of ambient lighting conditions, i.e. a darkened room is not required.

Loss of contrast through a non-polarizing color splitting device such as a Philips prism results from a combination of the geometrical effect from skew rays as well as diattenuation and phase differences in the coatings of reflective and total internal reflection surfaces. The geometrical effects of a polarizing beam splitter have been described in detail in the Ootaki (U.S. Pat. No. 5,459,593) and Miyatake (U.S. Pat. No. 5,327,270), the disclosures of which are hereby incorporated by reference, as follows below. These geometrical effects are a pure rotation of the input linearly polarized light by a polarizing beam splitter. Rear projection imaging systems typically have a contrast ratios of not less than 50:1 as suggested in Ootaki, in the plots showing a 2% dark level (100%/2%=50:1. In the Ootaki patent, white light from a halide or xenon lamp is incident at an angle of approximately 45° onto a polarizing cubic beam splitter. The polarizing cubic beam splitter reflects light which is of s-polarization and transmits light which is of p-polarization (where s-polarization refers to light which has its polarization vector perpendicular to the direction of propagation, while p-polarization refers to light which has its polarization vector lying in the plane of propagation). The light which is of s-polarization is reflected by the polarizing beam splitter towards a dichroic mirror. The dichroic mirror in the Ootaki patent is designed in such a way as to reflect the s-polarized light which is of one color while transmitting the other color components of the beam. The use of more than one dichroic mirrors results in a separation of the incident white light into various color channels. In a typical imaging system, two dichroic mirrors are sufficient to separate incident white light into red, green, and blue color channels. The color selectivity of the dichroic mirror is achieved by the placement of specific optical coatings upon the mirror, which is a well known technique in the art for color separation.

In Ootaki, the first dichroic mirror is aligned in such a way as to reflect the light of one specific color towards a liquid crystal light valve, also commonly referred to as a "reflective imager". The other colors are then transmitted through the first dichroic mirror to other dichroic mirrors, which are coated to allow reflection of individual colors towards their respective liquid crystal light valve imagers. Each liquid crystal light valve has the property of reflecting incident light, which in this case consists of the s-polarized "readout" light, along with the "writing" light from the "on" pixels which is inputted through the opposite side of the liquid crystal panel from a cathode ray tube. The light from the "on" pixels is of p-polarization. The synthesized image, which contains both the s-polarized light from the "off" pixels and the p-polarized "writing" light from each of the liquid crystal light valves passes back through the system and towards a polarizing prism of the cubic beam splitter type, which will only pass the p-polarized light directly through; and a final p-polarized image may be directed towards a screen through a projection lens.

A limitation in the quality of the performance of this system originates from the rotation of the plane of polarization in the polarizing prism for incident light rays which are not in an eigenstate. Since this rotation is independent of the state of the image generating pixels and causes leakage of light in the "off" state pixels the contrast is necessarily degraded.

Ootaki corrects for the geometrical effects of a polarizing beam splitter utilizing dielectric thin films on a tilted surface. In the color image display apparatus disclosed in Ootaki, each one of the 3 dichroic mirrors used for color separation at 45 degree incidence incorporate additional thin film layers to function as a compensating plate.

Miyatake discloses a similar approach to compensate for the polarizing beam splitter. The approach disclosed in the Miyatake patent is to compensate for the polarizing beam splitter with a quarter wave plate in the optical path between the reflecting type liquid crystal device and the polarizing prism. However this patent does not teach or consider phase differences that may occur in a color splitting device, such as a tilted dichroic mirror or a Philips prism. In the case of a Philips prism, phase differences occur from the reflection at the dichroic and total internal reflectance (TIR) surface. If the incident beam is convergent, so that the incident angle varies over the aperture of the beam, the modification of the polarization by each of these tilted surface is not uniform.

In U.S. Pat. No. 5,594,591 which issued to Yamamoto et al.; the disclosure of which is hereby incorporated by reference, the inventor has attempted to solve the same problem in a projection display wherein the color separation element is a Philips prism. This system is more compact than Ootaki's imaging system. A Philips prism is known in the art as a color separation device, to separate the polarized light into the three primary colors. The Philips prism disclosed in the Yamamoto et al. patent employs optical coatings upon the faces of the Philips prism for color separation and an anti-reflection coating on the incident prism faces, which also form TIR surfaces. Yamamoto et al. also assert that the optical coatings on the TIR surfaces, which comprise alternating layers of $SiO_2$ and $TiO_2$, have a phase control function. The dichroic optical coatings used for color separation cooperate with the anti-reflection coating layers at the TIR surface in achieving this phase control function. While the dichroic coating designs and their spectral and phase characteristics are not shown, it is suggested that they have some phase control function; which combined with a 90 degree phase difference at the TIR surface corrects for the image degradation contributed by the polarizing beam splitter. The variation of polarization with incident angle is not necessarily corrected for in this manner, as this variation is strongly influenced by the angle dependent reflection and phase retardance properties of the dichroic coating.

Optical thin film coatings represent a significant cost component of color separation optics. The inventions taught in Ootaki and Yamamoto require extra thin film layers in these coatings to achieve the optimum compensating function to offset polarization effects that result from non-collimated light incident upon a polarizing beam splitter. Furthermore the phase control function of these layers adds complexity and cost to the coating manufacturing and control process. The thin film thickness must be controlled such that the proper phase function is obtained without degrading anti-reflection or color separation characteristics.

The polarization of light can also be modified with birefringent materials, i.e. a material whose refractive index varies as a function of direction. Birefringent materials are commonly used to form ¼ wave compensator or retardation plates. Quarter waveplates effectively introduce a relative phase shift of 90° in one of the polarization components of the incident beam as the light goes through the material one time, if the plate is oriented per perpendicular to the optical axis (the axis of the direction of propagation of the beam). A quarter waveplate has a thickness equal to an integer multiple of $\lambda/4$ (hence the origin of the term "quarter wave plate"), where $\lambda$ is the wavelength of the light for a particular color channel. Accordingly, in a three color imaging system, there are three different waveplates each with different physical thicknesses calculated to be of a thickness appropriate for the wavelength of the particular channel.

Quarter waveplates can be formed from any of the typical birefringence optical materials. Typical birefringent optical materials include anisotropic crystals such as quartz, calcite, or mica, but may also be composed of organic materials having optical anisotropy. Optical anisotropy can be obtained by stretching sheets of polymeric materials to form films. Alternatively liquid crystal materials can be used as a variable compensating medium in the form of a liquid crystal cell wherein the orientation is modified by the application of electric field. Low molecular weight liquid crystals materials can be formed into solid materials having preferred orientation by the application electric field, or other orientation means, followed by the application of ultraviolet light to initiate a polymerization reaction. Additionally, high molecular weight polymers having liquid crystal properties are known and can be formed into compensating films or applied as discrete layers to substrates.

As previously indicated, conventional reflective imaging systems typically transmit light through a polarizing element, such as a polarizing beam splitter, which transmits or reflects a polarized component of the light, such as s-polarized light, to a color splitting device or color splitter, such as a Philips color splitting prism. Passing light through the TIR and dichroic interfaces of a Philips color splitting prism causes depolarization of the polarized light due to a combination of diattenuation, geometrical effects, and phase difference. While special coating designs can be used to make these phase differences offsetting, this is undesirable for practical manufacturing reasons. The use of conventional anti-reflection and dichroic coating designs in a color splitter changes the polarization state, thereby reducing image contrast and brightness. The phase change, or retardation, and intensity differences between polarization states transforms plane polarized light to elliptically polarized light. A polarizing beam splitter alone rotates the polarization vector of plane polarized light, which can be corrected with a quarter wave plate described by Ootaki. However, elliptical polarization is not corrected by the quarter wave plate. The combination of rotation and ellipticity of the polarization vector is the major source of light leakage when the reflective liquid crystal light valve is in the "off" state, decreasing the contrast ratio and brightness, thereby detracting from the image quality.

The key role of the quarter wave plate when used with a polarizing beam splitter, as taught by Miyatake, is to minimize the transmission of any off-axis polarization components due to geometrical effects in order to make the "off" state as dark as possible. The quarter wave plate can be oriented in such a way as to leave one of the linearly polarized light components, such as s-polarized light, unshifted, while effectively cancelling out unwanted p-polarized components for the "off" state of the reflective imager. When light is reflected from individual pixels of the liquid crystal light valve (LCLV) imager which are in the "off" state, the s-polarized component is again transmitted through the quarter wave plate unshifted. However, the unwanted p-polarized components will be shifted by another 90°, making a total shift of 180° with respect to its original direction, thereby cancelling out the unwanted components. Light reflected from the pixels of the LCLV which are in the "on" state will consist of p-polarized light. The p-polarized light reflected from the "on" state pixels will pass through the quarter wave plate only once and will accordingly be rotated only by 90°.

The image information from the LCLV travels back through the prism system to the polarizing beam splitter, which, as before, has the characteristic of reflecting s-polarized light while transmitting the final p-polarized image light towards the viewing screen. When utilizing a quarter wave plate in the optical path between each of the three liquid crystal light valves and the Philips prism in such a reflective imaging systems, the contrast ratio is improved by ensuring that the black level is closer to being completely black. While use of quarter wave plates in such a system proposes a means for the correction of rotations in the polarization vector due to the polarizing beam splitter, it does not address the undesired ellipticity and additional rotation added by the color splitter.

A quarter wave compensation plate is also used in U.S. Pat. No. 5,576,854 issued to Schmidt et al., the disclosure of which is hereby incorporated by reference. The Schmidt et al. patent was developed for monochromatic systems and does not address the issue of color imaging,. The system disclosed in Schmidt et al. works in a manner similar to the system disclosed in Miyatake, as previously described, namely by the reduction of off-axis depolarization induced by geometric effects when the light encounters the polarizing beam splitter. Schmidt et al. specifically mentions using a wave plate with a value of retardance equal to 0.25 to compensate for the off-axis polarization components generated by the polarizing beam splitter. However, Schmidt et al. additionally suggests that an additional retardance of 0.02 be included to compensate for the unwanted polarization shifts generated by the thermally induced birefringence of the LCLV, an effect which results in the dark state being lighter than desired. Accordingly, Schmidt et al. suggests that in monochromatic imaging systems the waveplate compensator have a total retardance value equal to 0.27 to compensate for the additional retardance, or phase delays between components due to the thermally induced birefringence in the LCLV.

It would be substantially beneficial to identify systems, methods and apparatus for improving the contrast in any imaging system using reflective liquid crystal light valves. More specifically, it would be a significant improvement in the art to minimize and correct for the rotations and ellipticity which occur in such systems that impair the contrast ratio by generating unwanted depolarization and contributing to light leakage in the "off" states of the image.

SUMMARY AND OBJECTS OF THE INVENTION

It is an object of the present invention to provide systems, methods and apparatus for improving the contrast ratio of a reflective imaging system which utilizes a color splitter which receives converging light from a polarized source impinging on a reflective imager, which then passes back through the color splitter whereby the polarizing source acts as an analyzer to emit a converging light cone toward a projection lens.

It is also an object of the present invention to provide systems, methods and apparatus for minimizing and correcting for the rotations and ellipticity which occur in such reflective imaging systems and impair the contrast ratio by generating unwanted components in the polarization, contributing to light leakage in the "off" states of the image.

It is a further object of the present invention to provide methods for separating the incident light into 3 colors with minimum loss of intensity at the desired wavelengths to form a color image of high brightness, while simultaneously achieving high contrast.

These and other objects and features of the present invention will become more fully apparent from the following description and appended claims, or may be learned by the practice of the invention as set forth hereinafter.

The present invention is directed to waveplate compensators having values which are uniquely optimized by identifying and minimizing particular polarization attributes. The waveplate compensators are utilized in reflective imaging systems wherein light is "double-passed" through the optical paths of the system. The optical paths can be summarized as follows: light passes through a polarizing beam splitter to polarize the light to a first polarization state and then enters a Philips prism. In the prism, the polarized light undergoes color-splitting through the use of dichroic and reflective coatings on selected surfaces. The separate colors are emitted from the prism assembly to reflective imagers or liquid crystal light valves, which change the polarizing state of the reflected light in accord with a desired image. The reflected light is passed, once again, through the prism assembly where the separate colors are converged and the diverging light is emitted to a projection lens for display of the image on a screen.

Color splitters which utilize optical interference coatings at oblique incidence, such as a Philips prism, typically exhibit a phase difference between the polarization states as well as diattenuation. This introduces rotation and ellipticity into the polarization state. The image brightness of the "on" state pixels is reduced while the brightness of the "off" state pixels is increased since the polarizing element is less effective as an analyzer in transmitting signals to the projection lens. The contrast ratio is determined by dividing the transmitted light having the selected polarization state, which corresponds to the "on" pixels of the liquid crystal light valve, by the amount of light transmitted which is in other states of polarization. This contrast ratio of the light from a reflective imaging system is a measure of the purity of the polarization state of the transmitted light. The higher the contrast ratio, the better the overall quality of the image.

The contrast ratio of a reflective imaging system is enhanced by the use of the inventive waveplate compensator positioned to intercept light being transmitted from the color splitter to the reflective imager and light being reflected from the reflective imager to be inputted for the second time into the color splitter. The waveplate compensator retardance value is selected with reference to minimizing particular polarization attributes.

The optimum contrast ratio is achievable if the retardance of the waveplate, being a function of the material and optical thickness of the waveplate, is calculated in such a way as to compensate and cancel out the unwanted polarization components for the "off" state of the image, thereby making the dark state close to completely black. This enhances the final image quality through a substantially improved contrast ratio. The optimum retardation is characterized by both the ellipticity and the ellipse orientation, or rotation of the polarized incident light, being sufficiently minimized for the entire cone angle of the illumination system or pupil.

The desired retardation is identified by calculating the ellipticity and orientation of the polarization vector at the edge of the pupil and then locating the retardation values at which both the ellipticity and orientation are simultaneously at a minimum. The ellipticity and elliptical polarization orientation are identified by: determining the pupil size of a cone of light as the light is incident in an image projection system at a location intended for placement of a waveplate compensator; determining the path of a ray, preferably a marginal ray; calculating the Stokes parameters; and then calculating both the ellipticity and elliptical polarization orientation of light at retardance value intervals. Preferably, progressively smaller iterations in the retardation are then made to optimize the contrast and brightness. The waveplate is oriented such that the maximum brightness is transmitted for pixels in the "on" state (i.e. the fast or slow axis is oriented at zero degrees with respect to the input polarization).

Display quality is enhanced when the intensity of each color channel is maximized in proper balance to insure accurate color rendition and purity with respect to a standardized display format, such as NTSC or PAL. In a double pass color separation imaging system the intensity for each color channel is maximized by 1) obtaining the maximum integrated throughput from the light source, or lamp, over the wavelength range which defines each color channel, 2) overlapping the entire spectral response over the wavelength range of the color channel for the s—polarized and p—polarized light, 3) matching the correction efficiency of the compensating plate over the entire wavelength range of the color channel, and 4) utilizing anti-reflection coatings on entrant, and preferably emergent, faces of polarizing and/or color separation optical elements having immersed dichroic or polarizing interference filters.

The goal of maximizing the brightness presents severe thin film design constraints. The aforementioned spectral characteristics cannot be changed independently of each other, nor can they be changed without affecting the rotational and elliptical distortion of the polarized light. Thin film interference filters that are used to reduce reflection and achieve color separation, dichroic mirrors, have angle dependent performance and must be optimized over the cone angle of the incident light. When light is incidence at oblique incidence on these coatings the s and p planes of polarization of the reflected light undergo changes in phase, δ. It is the objective of this invention to provide dichroic mirrors having efficient color separation and saturation whereby the undesirable polarization effects are completely corrected for by a combination of correcting optical elements. Specifically the dichroic filter performance is optimized so that any residual leakage which cannot be corrected for by the compensating plate is removed by an auxiliary filter element without compromising the brightness of each color channel, thereby maintaining their balance color fidelity.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
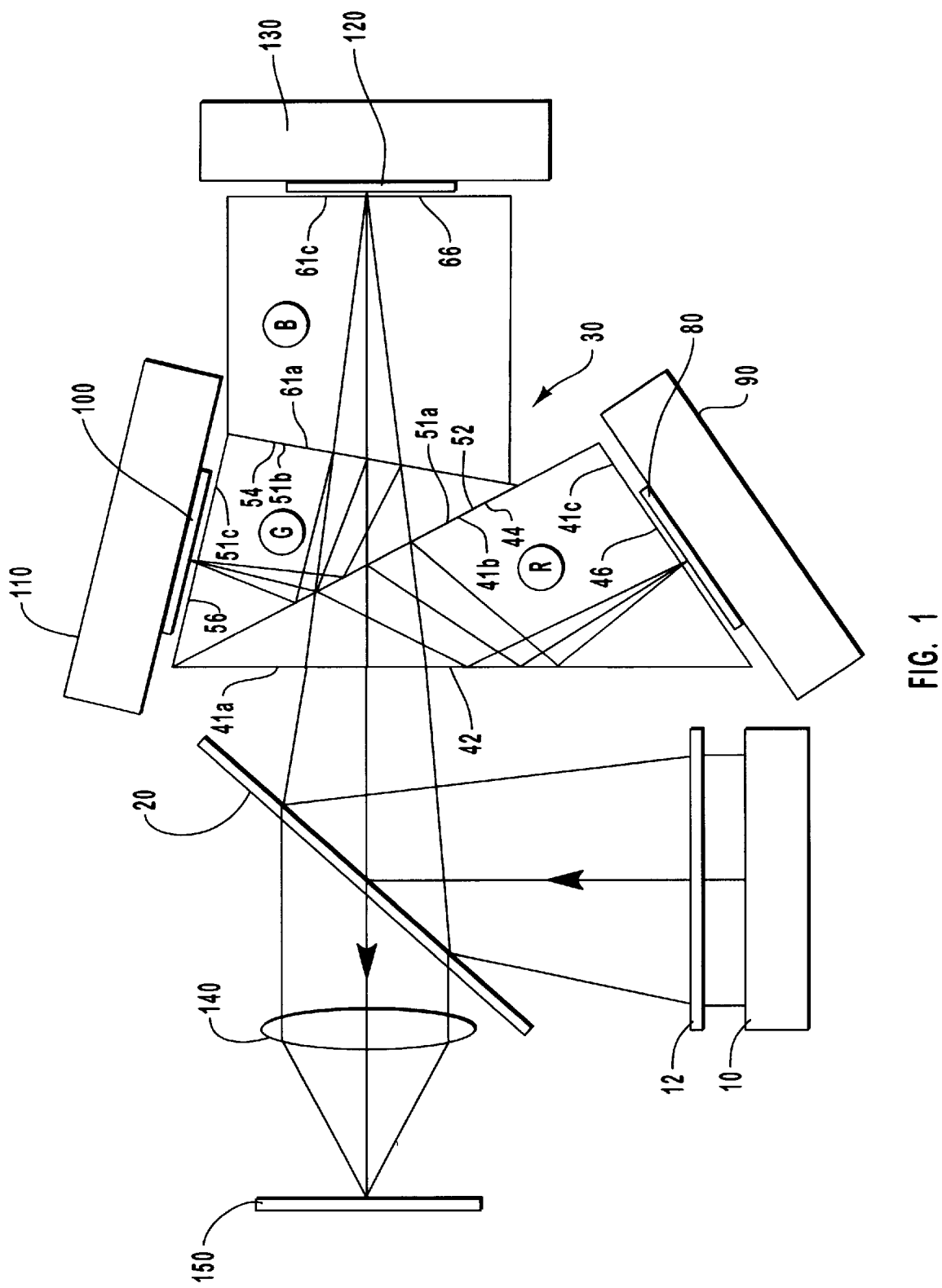
FIG. 1 depicts a schematic representation of a reflective imaging system utilizing the inventive waveplate compensators.

The present invention is directed to systems, methods and apparatus for improving the contrast ratio of a reflective imaging system which utilizes a color splitter. More particularly, the present invention is directed to methods and apparatus for correcting undesired depolarization of color splitters through the use of uniquely designed waveplate compensators. The waveplate compensator maximizes the transmission of light polarized in the "on state" while minimizing the transmission of light polarized in the "off state", thereby achieving a high contrast ratio which significantly improves the final image quality.

Light entering a reflective imaging system of the present invention passes through a polarizing device such as a polarizing beam splitter which delivers polarized light, such as s-polarized light, to a color splitter. The color splitter, such as a Philips prism, separates the polarized component of light into the three primary colors. S-polarized blue light, s-polarized green light and s-polarized red light exit the color splitter at three separate locations and are output to three reflective imagers, such as liquid crystal light valves. Each reflective imager modulates the polarization state of each of the three primary color lights and reflects the modulated light back into the color separation device in accord with a desired image such that the light is "double-passed" through the color splitter. Accordingly, if a polarized component of light, such as s-polarized light, initially enters a color splitter, the light is returned to the color splitter in the "on state" as three primary color lights which are p-polarized. The color splitter then outputs a divergent cone of p-polarized light which passes through the polarizing element and may then be directed towards a screen through a projection lens.

Conventional color splitters virtually always introduce some depolarization into the transmitted light due to geometrical and thin film coating effects. When transmitted by the color splitter, this portion of the light has polarization properties different than the desired polarization state and, thus, the presence of this light decreases the contrast ratio of the reflective imaging system. As previously indicated, the contrast ratio is determined by dividing the transmitted light having the selected polarization state, which corresponds to the "on" state of the liquid crystal light valve, by the amount of light transmitted which is in other state of polarization, corresponding to the "off" state. Additionally, as previously discussed, the contrast ratio of the light from a reflective imaging system is a measure of the purity of the polarization state of the transmitted light. The higher the contrast ratio, the better the overall quality of the image.

In accord with the systems, methods and apparatus of the present invention, the contrast ratio of a reflective imaging system is enhanced with a waveplate compensator positioned to intercept light being transmitted from the color splitter to the reflective imager and light being reflected from the reflective imager to be inputted for the second time into the color splitter. The waveplate compensator is formed from a material and has thickness which are selected with reference to minimizing particular polarization attributes. The details related to the waveplate compensator are set forth hereinbelow after an exemplary embodiment of a reflecting imaging system of the present invention is described.

FIG. 1 depicts an exemplary embodiment of the present invention which improves the contrast ratio of a Philips prism assembly used in a reflective LCD rear projection system. Although the embodiment shown in FIG. 1 is presented in the context of a reflective LCD system using a Philips prism, it will be appreciated that this is an example which is illustrative and not limiting.

The system shown in FIG. 1 receives input illumination from a light source 10, which may typically be white light from a source such as a xenon, metal halide or tungsten lamp. Light source 10 is an example of a light source means for providing light. The light from light source 10 is incident upon a polarizing beamsplitter 20. The light preferably passes through a color tuning filter or a notch filter 12, which is described in greater detail hereinbelow, before being directed to polarizing beam splitter 20.

As shown, the light is preferably directed to the polarizing beam splitter 20 as convergent light and then to a Philips type of prism assembly 30. It is also possible to have a light source directing light to a polarizing beam splitter as a collimated beam which then passes through a convergent lens (not shown) located between polarizing beam splitter 20 and Philips prism 30. Such a lens is an example of convergent lens means for converging light. The benefits of the present invention are, however, particularly appreciated when convergent light is utilized. The present invention corrects for both rotation and ellipticity which result when convergent light is used while collimated light generally introduces only rotation.

Polarizing beam splitter 20 is an example of a polarizer or a polarizing means for polarizing light such that a first polarized component of light in a first polarization state is transmitted. Another example of a suitable polarizing means is a polarizing cubic beam splitter. Polarizing beam splitter 20 transmits light of one type of polarization (either s- or p-polarized light; for the purpose of example, let the light in this case be of p-polarization), while reflecting light of the other type of polarization (s-polarized in this example) into a direction 90° with respect to the direction of incidence. S-polarized light refers to light which has its polarization vector perpendicular to the plane of incidence; whereas p-polarized light refers to light which has its polarization vector lying in the plane of incidence.

The s-polarized light is reflected into Philips prism 30. The Philips prism assembly is an example of a color splitter or color splitting means for separating a first polarized component of light into three primary color lights. Other examples of color splitting means include beamsplitter cubes, X-prisms, L-prisms and flat, tilted plate dichroic mirrors. Persons of skill in the art will appreciate, however, that the methods and apparatus of the present invention can also be applied to color splitters having residual phase difference and diattenuation, such as a color splitter utilizing antireflection or dichroic coatings having a non-zero but uniform phase difference across the spectral region of interest. Since other color splitters are also suitable for achieving the separation of the incident white light into separate color channels, the Philips prism should not be construed as limiting.

Philips prism 30 comprises a first triangular prism R, a second triangular prism G and third quadrangular prism B. Each prism is preferably formed from solid glass. Philips prism 30 is configured as a conventional Philips prism to orient the red, green and blue light channels respectively through prisms R, G and B. However, the Philips prism may utilize less conventional dichroic coating configurations such that the red, green and blue light channels are not respectively directed through prisms R, G and B.

Light enters into first triangular prism R, preferably at normal incidence, through incident surface 41a. Incident surface 41a is coated with a standard type of antireflection coating 42. The incident beam travels through the prism R until it encounters splitting surface 41b, which is coated with a dichroic coating 44. Dichroic coating 44 is designed to have particular spectral response and phase characteristics to act in cooperation with the other elements of the invention, which will be further described below.

These types of dichroic coatings are known in the art, and serve the purpose of reflecting light of one predetermined wavelength or color (red, for example) while transmitting light of all other colors (green and blue, for example). If the dichroic coating 44 on reflecting surface 41b is made such that it reflects red light, then the red light will be reflected at an angle towards incident surface 41a. The red light undergoes total internal reflection at surface 41a after which it passes out of prism R through exit surface 41c, which is coated with an antireflection coating 46 on the exterior surface. The light then enters waveplate compensator 80, also known as a retarder. The dichroic coating generally has a nonzero phase retardance and a substantially constant phase retardance for the wavelength of light encountering the dichroic coating.

Second triangular prism G has an incident surface 51a, a reflecting surface 51b and an exit surface 51c. Incident surface 51a of second triangular prism G is disposed adjacent reflecting surface 41b of first triangular prism R and is air spaced from this surface. The green and blue light transmitted through surface 41b and dichroic coating 44 passes through a small air space and then enters second triangular prism through incident surface 51a. Incident surface 51a is coated with an antireflection coating 52. A dichroic coating 54 is formed on reflecting surface 51b for reflecting the green component of the light and for transmitting the blue component of the light. The reflected green light is then directed to 51a where it undergoes total internal reflection and then passes out of prism G through surface 51c which is coated with an anti-reflection coating 56. The light then enters into a waveplate compensator 100.

The third quadrangular prism B has an incident surface 61a and an exit surface 61c. The incident surface 61a is mounted on reflecting surface 51b of second triangular prism G so that the blue component of light transmitted through dichroic coating 54 enters third quadrangular prism B through incident surface 61a and then exits via surface 61c which is coated with an anti-reflection coating 66. The light then enters into a waveplate compensator 120.

Any conventional infrared blocking coatings, anti-reflection coatings, dichroic coatings, color tuning filters coating may be utilized with the present invention, such as the coatings specified hereinabove as being located on the Philips prism. Examples of suitable infrared blocking coatings, anti-reflection coatings, dichroic coatings, color tug filters and other desirable coatings which may be utilized in the system, are set forth in detail in *Optical Thin Films User's Handbook* (1987) by James D. Rancourt, and *Design of Optical Interference Coatings* (1989) by Alfred Thelen, which is hereby incorporated by reference. The preferred dichroic coatings are set forth in copending U.S. patent application Ser. No. 09/079,997 entitled Thin Film Dichroic Color Separation Filters for Color Splitters in Liquid Crystal Displays and filed by Stephen D. Browning, Paul M. LeFebvre and Basil Swaby concurrently herewith; the disclosure of which is hereby incorporated by reference.

As there are typically three color channels, namely red, green, and blue, there could be three separate waveplate compensators 80, 100 and 120. However, waveplate compensator 120 is unnecessary in the preferred embodiment so there are only two waveplate compensators. Each waveplate compensator is in a light or optical path between the respective exit locations or exit surfaces 40c, 50c and 60c and the respective liquid crystal light valves 90, 110 and 130, such that there are three complete color channels. The waveplates may be attached or bonded directly onto either the color splitting means, such as Philips prism 30 or the reflective imager such as 90 or 110, may be free standing between the reflective imager and the color splitting prism, or may be buried in a prism component.

Each of the three colored cones of light is incident upon its respective reflective imager 90, 110 and 130 and the light from the liquid crystal light valves will be reflected back through the waveplate compensators 80, 100 and 120 and will contain the optical signal information which will form the final image for viewing upon a screen 150. Some of the pixels of the reflective imager or imaging liquid crystal light valves may be on and some off, in accordance with the image. Light which is reflected from the pixels which are on will have their polarization shifted by 90° by the liquid crystal light valves or LCLV, while light reflected from the pixels in the "off" state will not experience any change in polarization state due to the LCLV. Such liquid crystal light valves are examples of reflective imagers or reflective imager means for modulating a polarization state for each of the three primary color lights and for reflecting or redirecting the red light, the green light and the blue light thus modulated back into the color splitting means.

After reflected light from the pixels of each LCLV in the "off" state traverses back, the light passes through the corresponding waveplate compensators 90, 110, and 130 which are designed to effectively compensate for any rotations and ellipticity in the polarization vector. Accordingly, the contrast ratio in these liquid crystal imaging systems is enhanced by reducing the light leakage in the "off" states of the image into the "on" state. Contrast ratios on the order of 500:1 or greater can be achieved with the present invention.

The optical paths of "double-passing" the light in the system shown in FIG. 1 can be summarized as follows: light passes through a polarizing beam splitter 20 to polarize the light to a first polarization state and then enters the prism assembly 30. In prism 30, the polarized light undergoes color-splitting through the use of dichroic and antireflective coatings on selected surfaces. The separate colors are emitted from the prism assembly to reflective imagers 90, 110, and 130 which change the polarizing state of the reflected light in accord with a desired image. The reflected light is passed, once again, through prism assembly 30 where the separate colors are converged and the divergent light is emitted to a projection lens 140 for display of the image on a screen 150. Any conventional projection lens may be utilized. Such lenses are examples of projection lens means for projecting an image onto a screen.

Previous systems have utilized a quarter wave plate at the image to correct for the rotation introduced by a polarizing beam splitter. However, quarter wave plates are particularly inadequate in reflective imaging systems utilizing color splitters such as a Philips Is prism which is non-polarizing, have multiple dielectric surfaces and have a total internal reflection surface. The polarization in such complicated systems cannot be corrected simply with a quarter wave plate as the polarization is not simply rotated. The polarization vectors can be shifted, or rotated, off axis each time the light goes through the multiple layers of the dichroic coatings and as a result suffer from phase lags between the components of the beam as they progress through the optical media, which yield a degree of off axis components in the polarization. Such a complicated color splitting arrangement transmits light with a residual ellipticity and off-axis rotations of the polarization planes which yields unacceptable contrast without some mechanism such as the inventive waveplate compensators.

Accordingly, the waveplate compensators are necessary to adjust for nonuniform changes in the light as the light is incident upon the many reflective and transmissive surfaces in the imaging system. The inventive waveplate compensator effectively reduces unwanted polarized light entering the prism assembly for the second pass-through and thereby increases the polarization purity of the light that is emitted from the prism assembly to the projection lens. The value of the waveplate compensator is selected to effect a predetermined phase difference to retard, and thereby substantially eliminate, that portion of the inputted light from the reflective imager that is incident at an angle to the plane of polarization of the color splitter, i.e., light that is not in an eigenstate of the plane of polarization of the color splitter. In this manner, the portion of light inputted from the reflective imager that undergoes depolarization is substantially reduced such that the contrast ratio of the reflective imaging system is greatly increased and the outputted convergent cone of light is substantially entirely composed of light having the selected polarization state and a high-contrast projection image is achieved.

Stated otherwise, since certain optical elements such as polarizing beam splitter 20 directionally modify the skew rays comprising a first polarized component of light, it is necessary for the waveplate compensator to then modify the polarization state of the skew rays passing therethrough. As a result of utilizing such a waveplate compensator, a second component of light having a second polarization state enters into Philips prism 30 with each skew ray having a second polarization vector substantially orthogonal to the first polarization vector of the respective skew ray.

The waveplate compensators are composed of a birefringent material, usually an anisotropic crystal such as quartz, calcite, or mica; however, certain types of organic polymeric plastics which have different indices of refraction for different crystallographic axes are also suitable.

A preferred form of a waveplate compensating material is stretched organic polymer film due to its low-cost and ease of obtaining the film with different retardation values. However, such films typically have a surface that is largely unsuitable in this application since it results in image distortion unless the resulting compensator is attached to the color splitting means, such as the exit surfaces of the prism, and is also substantially separated from the image plane.

The waveplate compensator may also be liquid crystal materials in the form of a typical liquid crystal or LCD cell. Additionally, a liquid crystal material can be transformed into a solid after the appropriate molecular orientation has been achieved. This can be done with a polymer having liquid crystal side chains or photopolymerizable liquid crystal molecules.

The LCD cell is contained between two opposing surfaces such as two opposing plates. Additionally, the two opposing surfaces may also be a single plate opposite a surface of the color splitting means, such as exit surfaces 41c of prism 30, or a single plate opposite a surface of the imager means, such as the surface of imager 90 opposite exit surface 41c.

The waveplate compensator is preferably oriented at 0° and the fast axis of the waveplate compensator is preferably oriented parallel to the desired input polarization state from the reflective imager. More specifically, each waveplate compensator is oriented in such a manner that when the light is, for example s-polarized, the s-polarized component remains unshifted while other components are shifted by a specific amount in one pass. The change in shift is determined through the equation $\Delta\phi=2\pi\,\Delta n(d/\lambda)$; where $\Delta\phi$ is the phase shift incurred in one pass through the waveplate compensator, $\Delta n$ is the difference in the refractive indices of the two optical axes of the waveplate and is characteristic of its birefingence, d is the physical thickness of the waveplate, and $\lambda$ is the wavelength of the light.

The present invention suggests that optimum contrast ratio is achievable if the retardance of a waveplate is selected such that the unwanted polarization components for the "off" state of the image are substantially eliminated or diminished. As a result, the dark state is close to completely black which substantially improves the contrast ratio, thereby enhancing the final image quality.

Such benefits are achieved by retarding light by a wave value at which both the ellipticity and the elliptical polarization orientation of the light are approximately at a minimum. The value at which both the ellipticity and the elliptical polarization orientation of the light are approximately at a minimum is referred to herein as the polarization rotation elimination retardance value. After the polarization rotation elimination retardance value is identified then a waveplate compensator can be obtained which has a retardance selected to retard light by a wave value which corresponds with the polarization rotation elimination retardance value. Selecting the retardance of the waveplate compensator involves selecting a birefringent material and then identifying the thickness necessary to yield the desired retardance.

Figure 2:
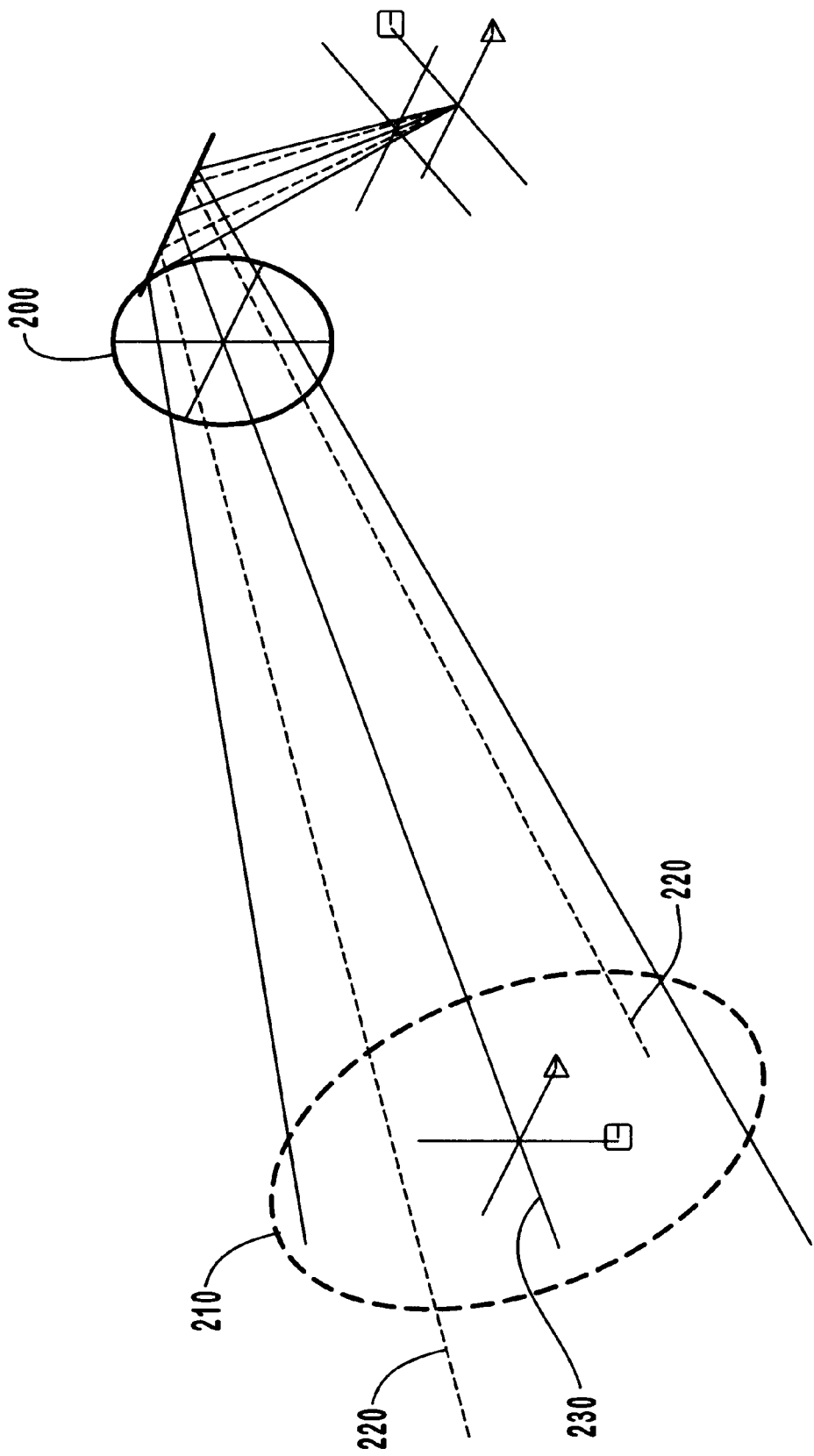
FIG. 2 is a schematic perspective view of a simple BK7 prism depicting a pupil and a marginal ray traced for ellipticity and orientation calculation.
Figure 3:
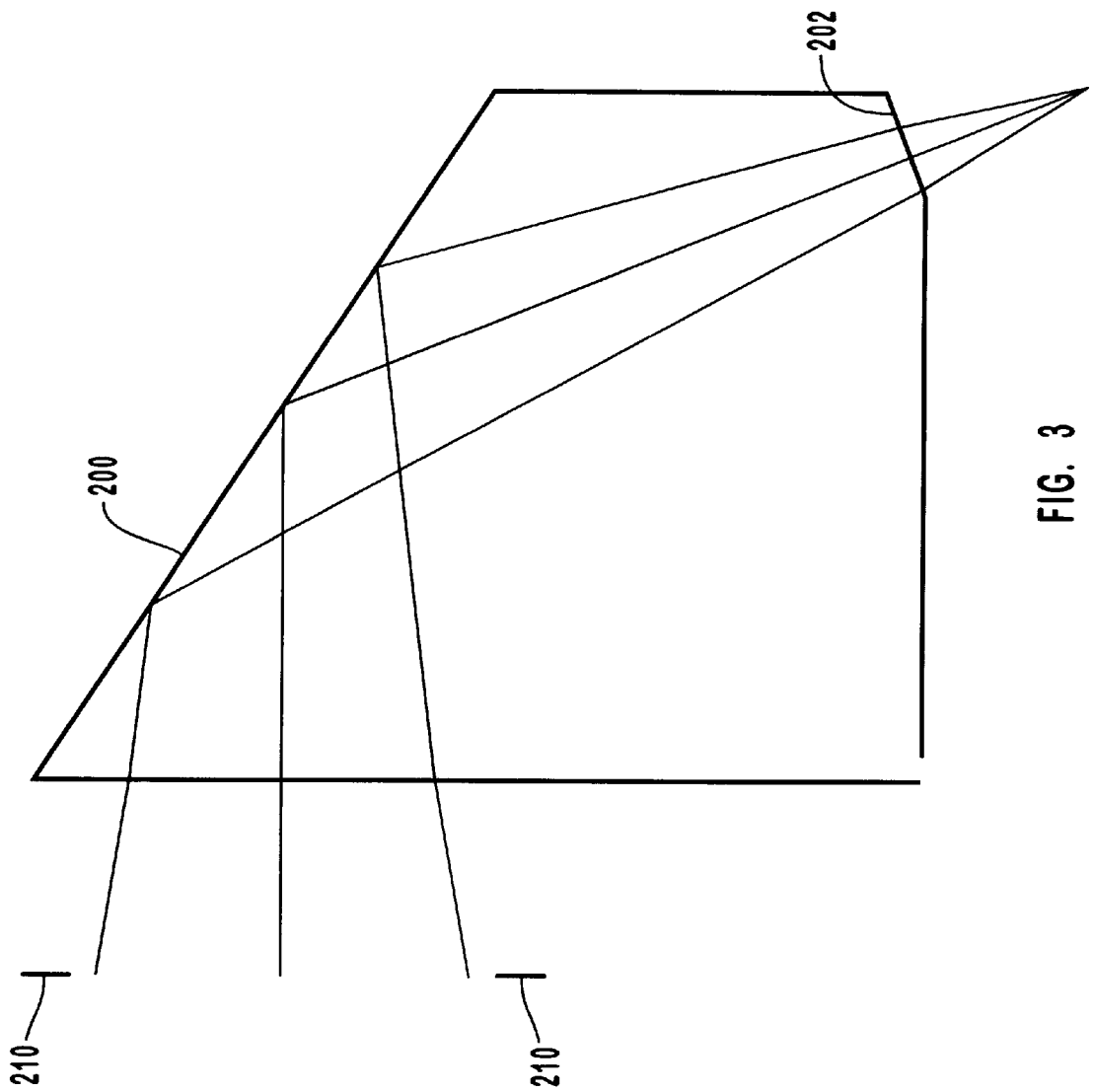
FIG. 3 is a schematic side view of the simple BK7 prism shown in FIG. 2 depicting a pupil and a marginal ray traced for ellipticity and orientation calculation.
Figure 4:
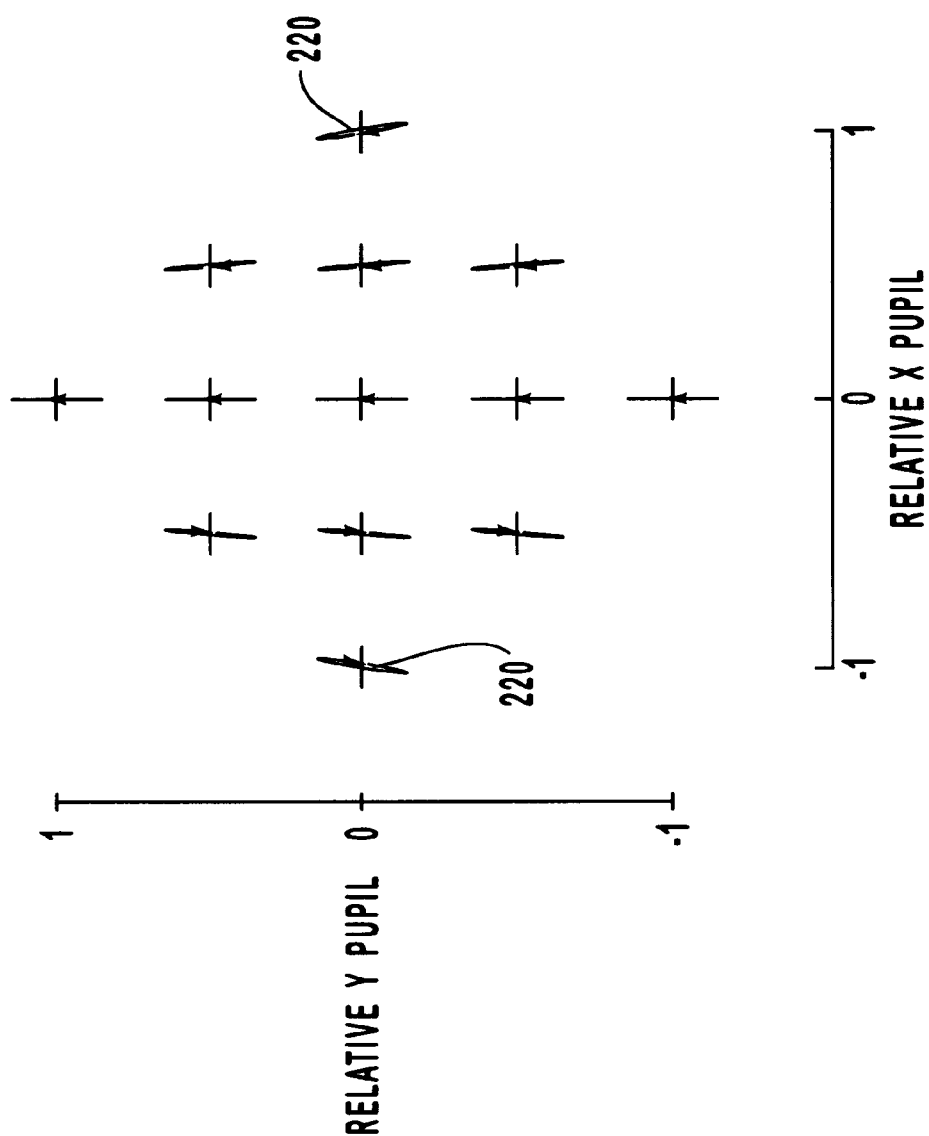
FIG. 4 is a polarization pupil map which relates to the light path shown in FIGS. 2–3 and which graphically shows the resulting ellipticity and orientation change due to the total internal reflection surface.

One method of identifying a wave value at which both the ellipticity and orientation are simultaneously at a minimum involves calculating the ellipticity and orientation of the polarization vector at the edge of the pupil. The calculations are based on the principle that the ellipticity and orientation can only be corrected "perfectly" at one point in the pupil or incident ray angle. The pupil is a two dimensional cross-section, the two dimensions being the spatial coordinates of the plane perpendicular to the direction of propagation of the beam, of a cone of light. The invention utilizes the extreme pupil ray, sometimes referred to as the marginal ray. The marginal ray refers to the ray traced from the source point to the edge of the pupil at its widest point. A marginal ray is shown at 220 in FIG. 2 and FIG. 4. FIGS. 2–4, which are based on a simple total internal reflection prism, are discussed in Example 1 in greater detail.

The marginal ray 220 or pupil point is used for the calculations. It should be understood that other rays within the pupil may also be used depending on other conditions such as pupil uniformity. FIG. 4 which is also discussed in Example 1 graphically shows the resulting ellipticity and orientation change for a single TIR surface. The calculations are also based on mathematical descriptions of polarized light. For example, the possible states of polarized light can be represented by a set of four intensity quantities known as Stokes parameters. The four Stokes intensity parameters are designated by $S_0$, $S_1$, $S_2$, $S_3$. Operationally, the term $S_0$ represents the total intensity, $S_1$ represents the intensity through a horizontal linear polarizer, $S_2$, represents the intensity through a 45° linear polarizer, and represents the intensity through a right circular polarizer. The Stokes representation is thoroughly described in "Ellipsometry and Polarized Light" by Azzam, which is hereby incorporated by reference.

Polarized light may be conveniently described by resolving the components of the electric field vector into an x and a y component, z being the direction of propagation of the light beam. Rotation can be parameterized in terms of an angle in the x-y plane by which the polarization vector is rotated from its initial orientation after light passes through some medium or undergoes reflection at an interface. The orientation of the polarization vector after it passes through a system can be calculated by following, the rotations of the electric field vector through this system.

In conventional notation a perfectly monochromatic electric field vector is comprised of two orthogonal vibrations independent of time with a form $$E = \begin{bmatrix} E_x \\ E_y \end{bmatrix} = \begin{bmatrix} |E_x|e^{i\delta_x} \\ |E_y|e^{i\delta_y} \end{bmatrix}$$

where $|E_x|$ and $|E_y|$ are the electric field amplitudes and $\delta_x$ and $\delta_y$ are the phase components of the wave. Using this definition, the Stokes parameters or vectors can be recast as:

$S_0 = E_x^2 + E_y^2$ $S_1 = E_x^2 - E_y^2$ $S_2 = 2E_xE_y \cos \Delta$ $S_3 = 2E_xE_y \sin \Delta$ where $\Delta = \delta_y - \delta_x$ and is commonly known as the phase difference. With this formulation, a ray can be traced through an optical system containing thin film coatings, total internal reflection surfaces, and polarization components using standard techniques as referenced herein or with commercially available software. To find the ellipticity and orientation of the resulting polarization ellipse given the Stokes vector at the output of the system, the following equations are defined:

Orientation=$\alpha$=½arctan($S_2/S_1$)

Ellipticity=$e$=tan[½arcsin{$S_3/((S_1)^2+(S_2)^2+(S_3)^2)^{1/2}$}]

After understanding that the orientation of the polarization vector is described through an angle $\alpha$ and that the ellipticity is expressed through the parameter e, then $\alpha$ and e are calculated with a retarder orientated at 0° with respect to the input polarization in double pass through the prism. The retarder value is varied between 0 and 0.5 wave and a null configuration for both orientation and ellipticity is located to determine the optimum value of the compensator.

These calculations can be done by hand, or alternatively, one may input the parameters in the above equation into a suitable computer program since such calculations can be tedious for systems that contain up to hundreds of layers of optical materials of varying composition. In addition to four Stokes intensity parameters, there are other methods of mathematically describing polarized light which can be utilized to calculate and describe ellipticity and orientation. These include but are not limited to the Jones vector and coherency matrix representations. Software programs such as "Code V", which is produced by Optical Research Associates of Pasadena, Calif., and is utilized for optical ray tracing using the Jones calculus to propagate the light through the system and to then calculate the Stokes vector from this information.

The ray tracing programs perform the aforementioned calculations for every interface in the optical system for each of the user defined rays. The intensity and polarization of each ray is calculated sequentially as it is modified by each interface and material through which it traverses in the calculated optical path. Additional details on these procedures and algorithms can be found in the operation manual for "CODE V" dated August 1997, for version 8.20, which is hereby incorporated by reference. The ray tracing program is used in this invention to calculate the phase retardance in transmission and reflection at each interface as well as the intensity, in reflection and transmission for each polarization direction. The rotation, ellipticity and intensity in the "on" and "off" states are calculated for a plurality of skew rays which represent the marginal rays, at the periphery of illumination cone, and rays having various intermediate angles between chief ray and marginal rays.

Repeated calculations are then made with the ray tracing program to optimize to display brightness and contrast. The first step is to construct an analytical model of the optical system. Thin film designs for the anti-reflection and dichroic coating can be optimized using a commercially available thin film design program, examples of which are "TFCALC", commercially available from Software Spectra Inc. of Portland, Oreg. As shown in FIG. 4, a plurality of skew rays, preferably twelve skew rays, including the marginal rays which have the maximum angle of incidence as defined by the optical systems f#, are used in this simulation along with the chief ray, which is parallel to the optic axis. When the thin film coating designs are specified for each surface (along with the refractive index of the thin film materials and the other optical elements and the polarizing characteristics of the liquid crystal light valve in the "on" and "off" states) the ray tracing program can calculate and display the ellipticity and rotation for all the specified rays.

Figure 7:
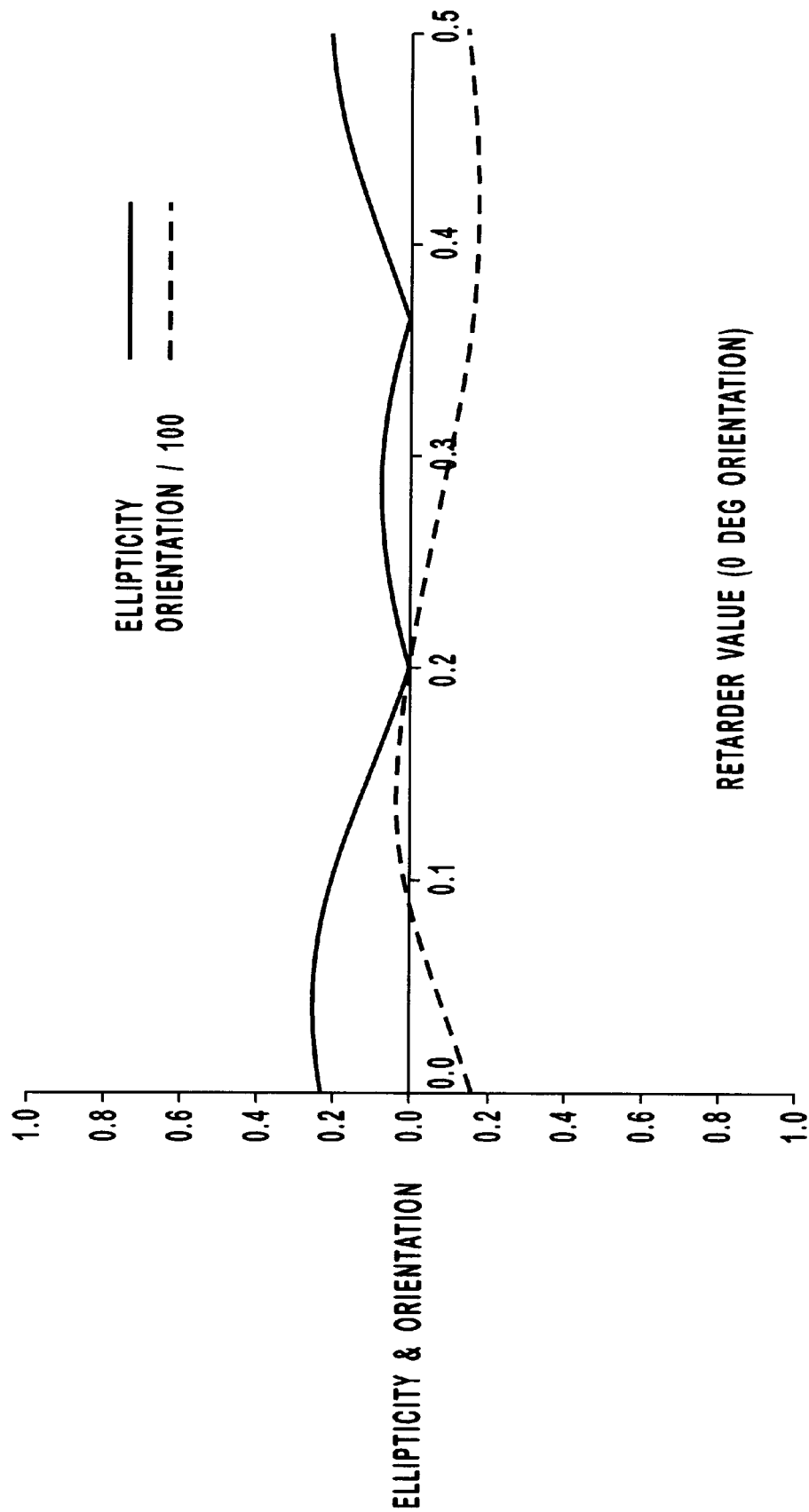
FIG. 7 is a plot of the ellipticity and orientation of the polarization vector at the marginal ray location for a waveplate compensator having retardance values ranging from 0 to 0.5 at an orientation of 0° with respect to the input polarization state. More particularly, FIG. 7 plots the relevant values as the red light passes through the first triangular prism R of the Philips prism shown in FIG. 1, liquid crystal light valve 90 and waveplate compensator 80 located therebetween, which has incrementally varied retardation values.
Figure 14:
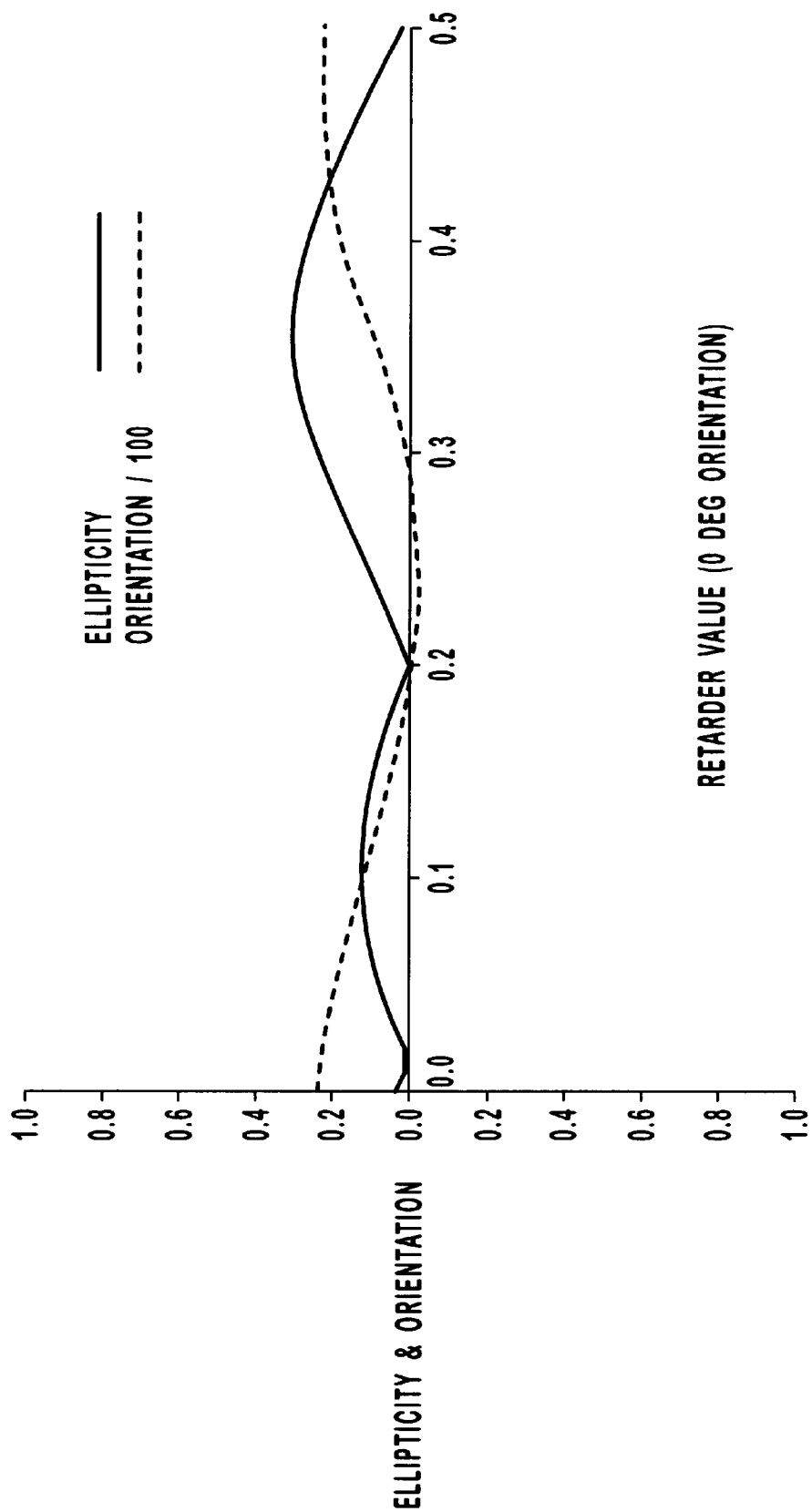
FIG. 14 is a plot of the ellipticity and orientation of the polarization vector at the marginal ray location for a waveplate compensation having retardance values ranging from 0 to 0.5 at an orientation of 0° with respect to the input polarization state. More particularly, FIG. 14 plots the relevant values as the green light passes through the second triangular prism G of the Philips prism as in FIG. 1, liquid crystal light valve 110 and waveplate compensator 100 located therebetween, which has incrementally varied retardation values.
Figure 21:
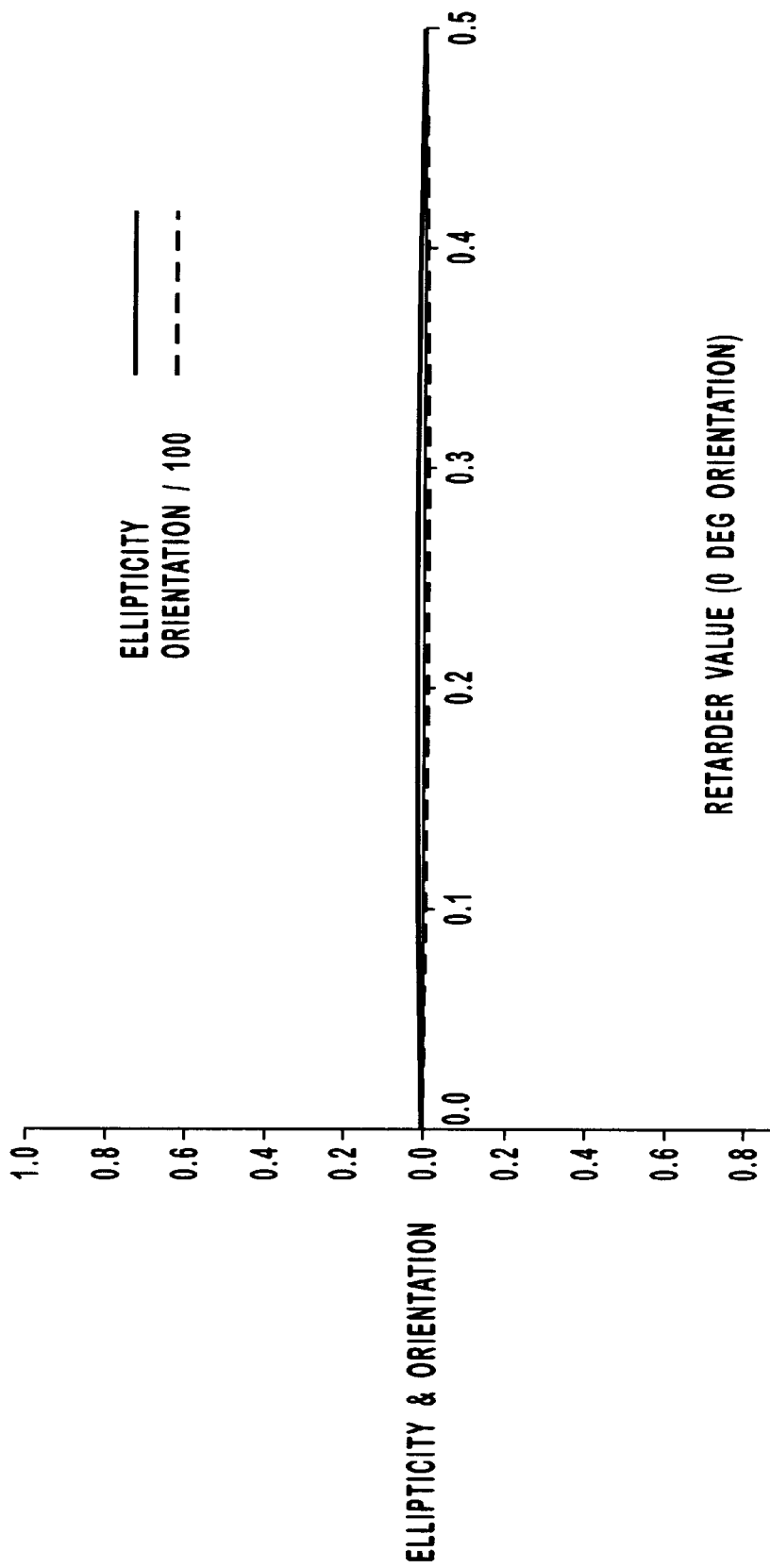
FIG. 21 is a plot of the ellipticity and orientation of the polarization vector at the marginal ray location for a waveplate compensator having retardance values ranging from 0 to 0.5 at an orientation of 0° with respect to the input polarization state. More specifically, FIG. 21 plots the relevant values as the blue light passes through the quadrangular prism B of the Philips prism shown in FIG. 1, liquid crystal light valve 130 and waveplate compensator 120 located therebetween, which has incrementally varied retardation values.

Optimum values of thickness of the waveplate can range anywhere from 0 to half of wavelength or $\lambda/2$ and will vary from system to system. After the ellipticity and orientation have been calculated for intervals of a wavelength, it is preferable to graph the calculated values of the ellipticity and rotation of the polarization for a particular system as a function of retardance. Examples of such graphs are shown in FIGS. 7, 14 and 21. The value where the ellipticity and rotation both intersect the abscissa, in other words, when both are simultaneously equal to zero, then the corresponding value of retardance on the abscissa is the optimum value of the waveplate for a particular imaging system.

The waveplate value is separately calculated for each color channel as each color channel could require a different waveplate. Specific examples of identifying the ellipticity and orientation minimums for separate channels are provided by Examples 2–4 which correspond with FIGS. 5–12.

The optimized retardation value for a compensating plate is found in two stages. In the first stage a marginal ray is corrected to remove rotation and ellipticity. This is done by modeling an additional compensating element in the ray tracing program having a variable retardance. The retardance is set at finite values from 0 to 0.5. By plotting the rotation and ellipticity for the marginal ray for each of these finite retardance values it is possible to identify a first local minima wherein both the ellipticity and rotation are close to zero.

The object of the simulation is to optimize the contrast and brightness of the display. In this second stage of optimization, the relative intensity of the all the rays are calculated and summed to give an integrated intensity over the cone angle, which will be proportional to the observed brightness of the actual image in the "on" state. The contrast is determined as set forth hereinbelow.

Brightness=Σ of the intensity of each ray in the "on" state across the applicable wavelength range.

After making the identical calculation for the "off" state, the contrast may calculated as:

Contrast=Σ of the intensity of each ray in the "on" state/Σ of the intensity of the ray in the "off" state Another method of identifying the optimum retardance value of the waveplate is to plot measured or experimentally determined values of the ellipticity and rotation of the polarization for a particular system as a function of retardance. This can be accomplished by measuring the Stokes parameters with techniques known to those skilled in the art. While it is possible to obtain the data required to calculate the ellipticity and orientation experimentally, it is preferable to obtain the data through calculations.

The waveplate compensators disclosed herein are examples of waveplate compensator means for retarding at least one of the three primary color beams to achieve a predetermined phase difference.

As mentioned hereinabove, it is preferable to direct the light through a color tuning filter or a notch filter as shown in FIG. 1 at 12. Notch filters are especially useful in the first color channel, such as the red color channel, described in conjunction with first triangular prism R as the reflection angles within the prism are relatively extreme. Such notch filters are examples of notch filter means for tuning the wavelength ranges of light transmitted by the polarizing means to the color splitting means. More specifically, the notch filter means reflects incidental light such that the light entering the color splitting means has selected wavelength ranges.

EXAMPLES OF THE PREFERRED EMBODIMENTS

Examples are provided of the present invention in order to provide specific models for identifying the optimal wave retarder material and thickness in accordance with the present invention. Examples 1 and 2 do not involve the use of a waveplate compensator but are included to provide examples of rotation and ellipticity. Examples 3A–3D are all related to a projection system as shown in FIG. 1. Examples 3A–3C set forth the properties of each respective color channel. Example 3D details a notch filter as shown in FIG. 1 at 12 which is used in the system detailed in Examples 3A–3C.

Example 1

FIG. 2 is a schematic perspective view and FIG. 3 is a schematic side view of a simple BK7 prism used as an example to determine the orientation and ellipticity in accordance with the methodology described hereinabove with reference to the Stokes parameters. FIGS. 2 and 3 depict a total internal reflection prism at 200 and a pupil at 210. A marginal ray traced for ellipticity and orientation calculation is shown at 220. The chief ray is shown at 230. It should be understood that other rays within the pupil may also be used depending on other conditions such as pupil uniformity.

Figure 5:
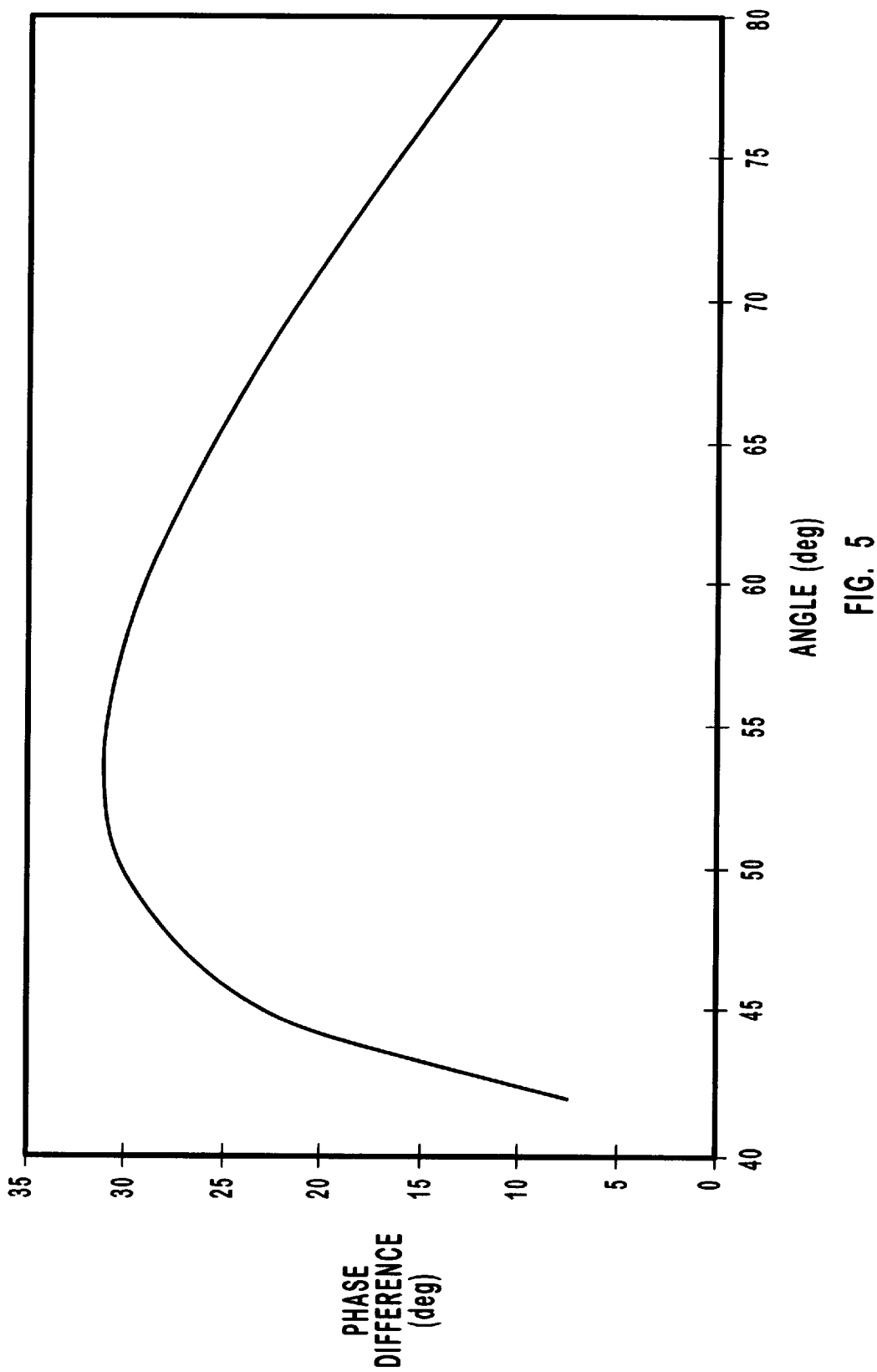
FIG. 5 illustrates the phase difference, in degrees, vs. angle, in degrees, for total internal reflection in a substrate having a 1.52 index for fraction.

The calculations were based on an incident converging light entering the prism with a 10° cone angle (F/# 2.88), striking a total internal reflection surface tilted to 56°, and then exiting the prism at exit surface 202. It was assumed that the prism surfaces had no coatings, so the transmission losses were due to Fresnel reflection losses at the input and output faces. FIG. 5 depicts the variation in phase difference vs. the angle at which total reflection occurs, for a substrate having a refractive index of 1.52. While rays parallel to the optic axis undergo reflection at 56° resulting in a phase difference of approximately 30°, the phase difference of skew rays in the y-z plane will vary from 28° to about 32°. The s-polarization and the p-polarization vectors for skew rays lying in the x-z plane differ from the respective s-polarization and p-polarization vectors for the chief ray and rays lying within the y-z plane. The phase difference on reflection at the TIR surfaces in FIG. 3 will be compounded for the rays in the x-z plane according to FIG. 5, resulting in a net change in the polarization state varying with the angle between the skew rays and the z axis, of the optic axis. The greatest change occurs for a marginal ray at the edge of the pupil in the x-z plane.

Tracing a marginal ray at the edge of the pupil as shown in FIG. 2, the Stokes parameters can be calculated as provided hereinbelow in Table 1.

TABLE 1

|  | $ST_0$ | $ST_1$ | $ST_2$ | $ST_3$ |
| --- | --- | --- | --- | --- |
| Input Polarization | 1.00000 | −1.00000 | 0.00000 | 0.00000 |
| Prism Entrance | 0.95536 | −0.95536 | 0.00000 | 0.00000 |
| TIR Surface | 0.95536 | −0.77473 | −0.55402 | −0.07460 |
| Prism Exit | 0.91278 | −0.87294 | −0.25702 | −0.07140 |
| Image | 0.91278 | −0.87294 | −0.25702 | −0.07140 |

Using these parameters in the ellipticity and orientation equations as set forth above based on the Stokes parameters yields an orientation of 8.203° and an ellipticity of −0.039. A polarization pupil map is shown in FIG. 4 which graphically shows the resulting ellipticity and orientation change of the total internal reflection surface. The polarization vector for skew rays which have a relative x axis pupil displacement of zero is not modified, while the maximum polarization vector rotation and ellipticity occurs for skew rays on the relative y axis pupil equals zero, when the relative x-axis pupil is −1 or 1.

Example 2

Figure 6:
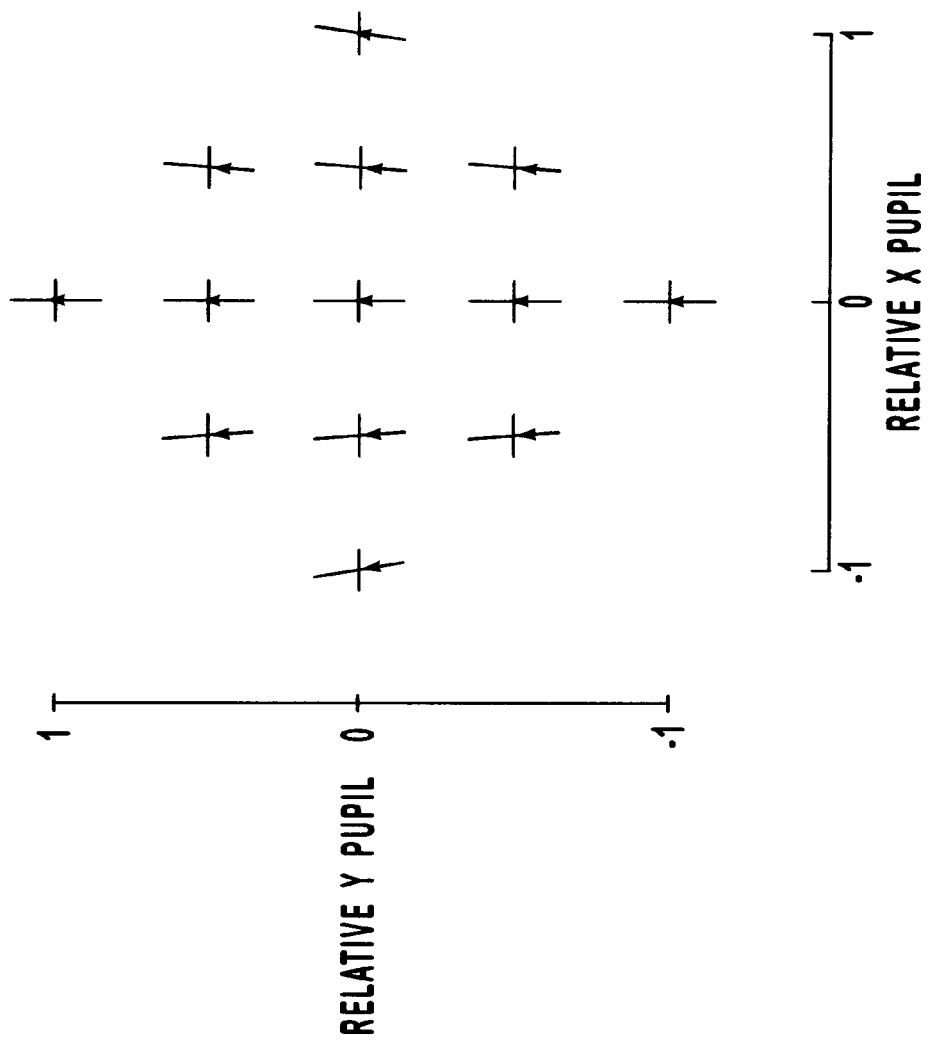
FIG. 6 is a pupil map of the polarization state for a polarizing element tilted at 45° with respect to the optic axis for a cone angle equal to F/2.8, which is equivalent to 10° in air.

FIG. 6 provides an example wherein the prism in example 1 is replaced by a polarizing element tilted at 45° in the optical system having an illumination cone angle equal to an f# of 2.8, which is equivalent to 10° air. The polarizing element does not comprise any interference coatings. Thus, it can be seen that a polarizing element, such as is disclosed in U.S. Pat. No. 5,549,593 issued to Ootaki, only causes rotation, and not ellipticity.

Overview of Examples 3A–3D

Examples 3A–3D are all related to a projection system as shown in FIG. 1. Although, Examples 3A–3D all relate to a single exemplary system, each example highlights the characteristics of separate portions of the system.

Figure 22:
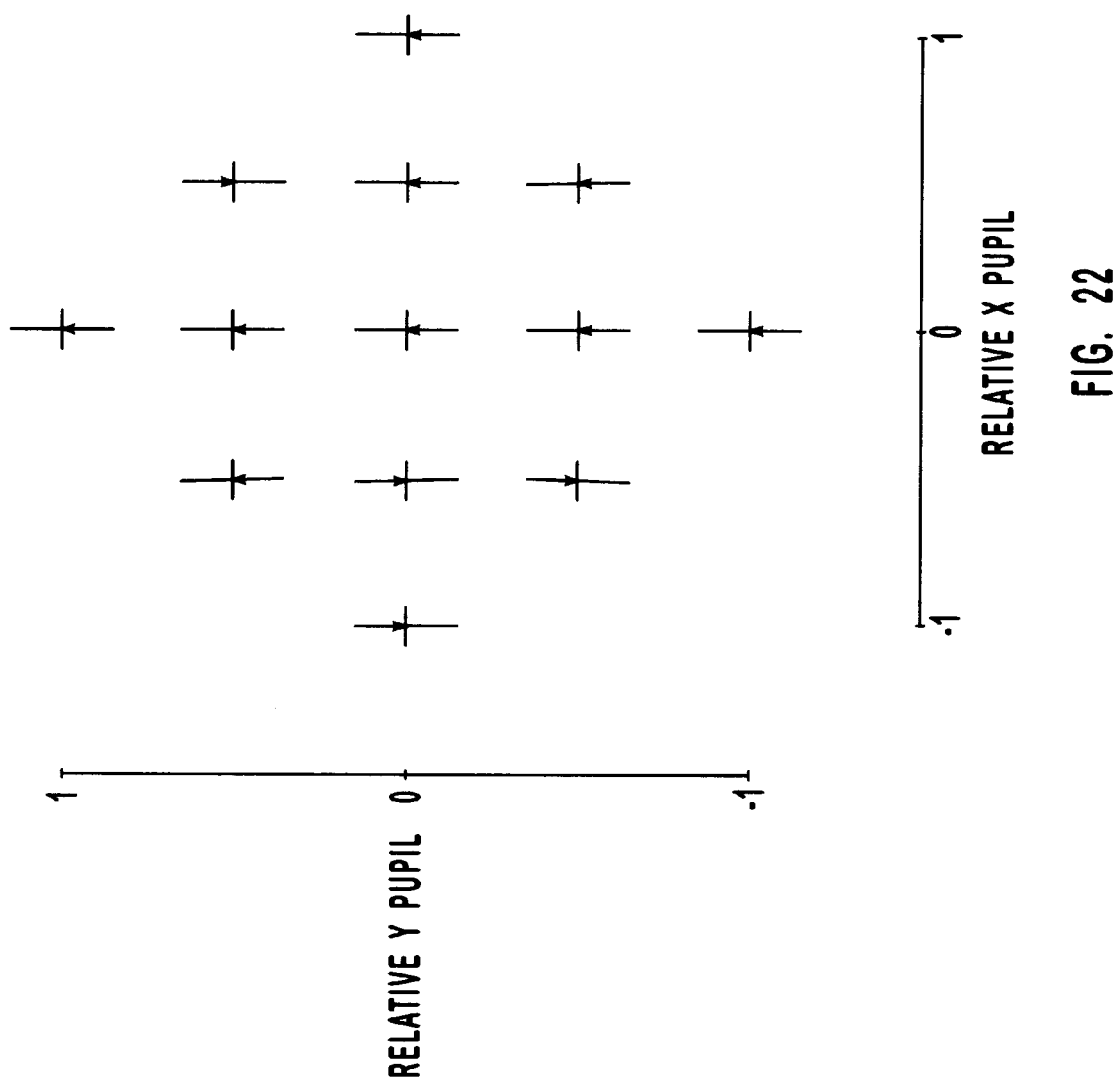
FIG. 22 relates to FIG. 21 and is a pupil map of the polarization state through the third channel, the blue light channel, without a compensator plate.

The benefits of utilizing a reflective imaging system as shown in FIG. 1 with a waveplate compensator of the present invention and the same system without a waveplate compensator are compared in Examples 3A–3C. Each of the color channels, red, green and blue, are separately described respectively in Examples 3A–3C. Example 3A describes the properties of the red color channel of the system with reference to FIGS. 7–13. Example 3B sets forth the properties of the green color channel with reference to FIGS. 14–20. FIGS. 21–22 relate to the blue color channel described in Example 3C. Example 3D details a notch filter or color tuning filter as shown in FIG. 1 at 12 which is used in the system detailed in Examples 3A–3C. Example 3D described the notch filter with reference to FIG. 23.

The rotation and ellipticity which results in each color channel are shown before a waveplate compensator is used. The results are then compared when a waveplate compensator is utilized which has been designed to have an optimal retardance.

Examples 3A and 3B detail the optical properties of the thin film materials, the thickness of the thin film layers and the order of deposition of each antireflection coating and dichroic coating respectively located on Prism R and Prism G of the Philips prism depicted in FIG. 1. The sequence and thickness of the deposited materials are provided in Tables 2–5. These coatings are merely exemplary of antireflection coatings and dichroic coatings which may be utilized as any suitable antireflection coating and dichroic coating may be utilized.

Figure 10:
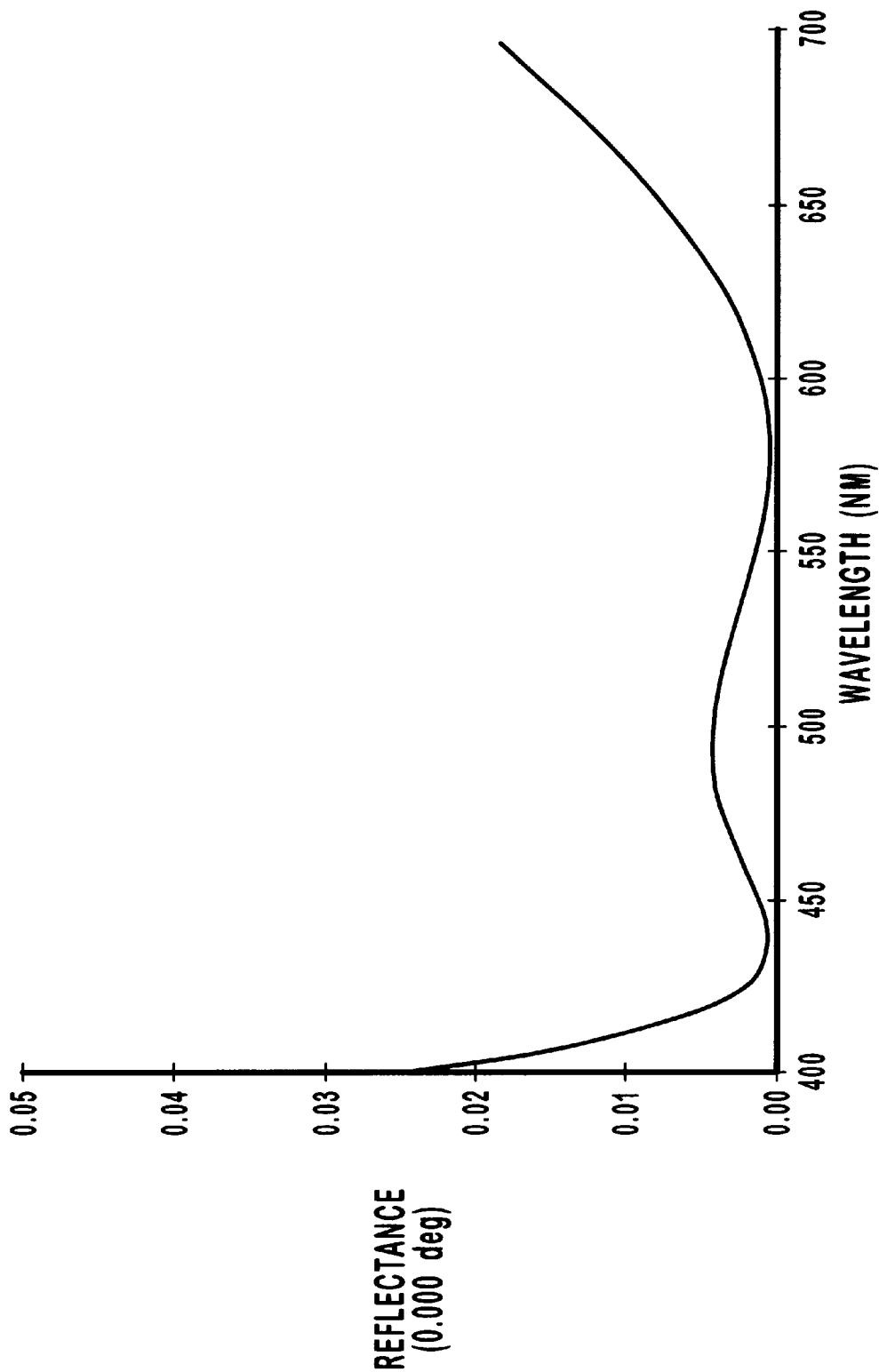
FIG. 10 illustrates the calculated reflectance for unpolarized, s-polarized and p-polarized light at normal incidence of the anti-reflection coatings on surface 41a of prism R in FIG. 1, from 400 nm to 700 run.
Figure 11:
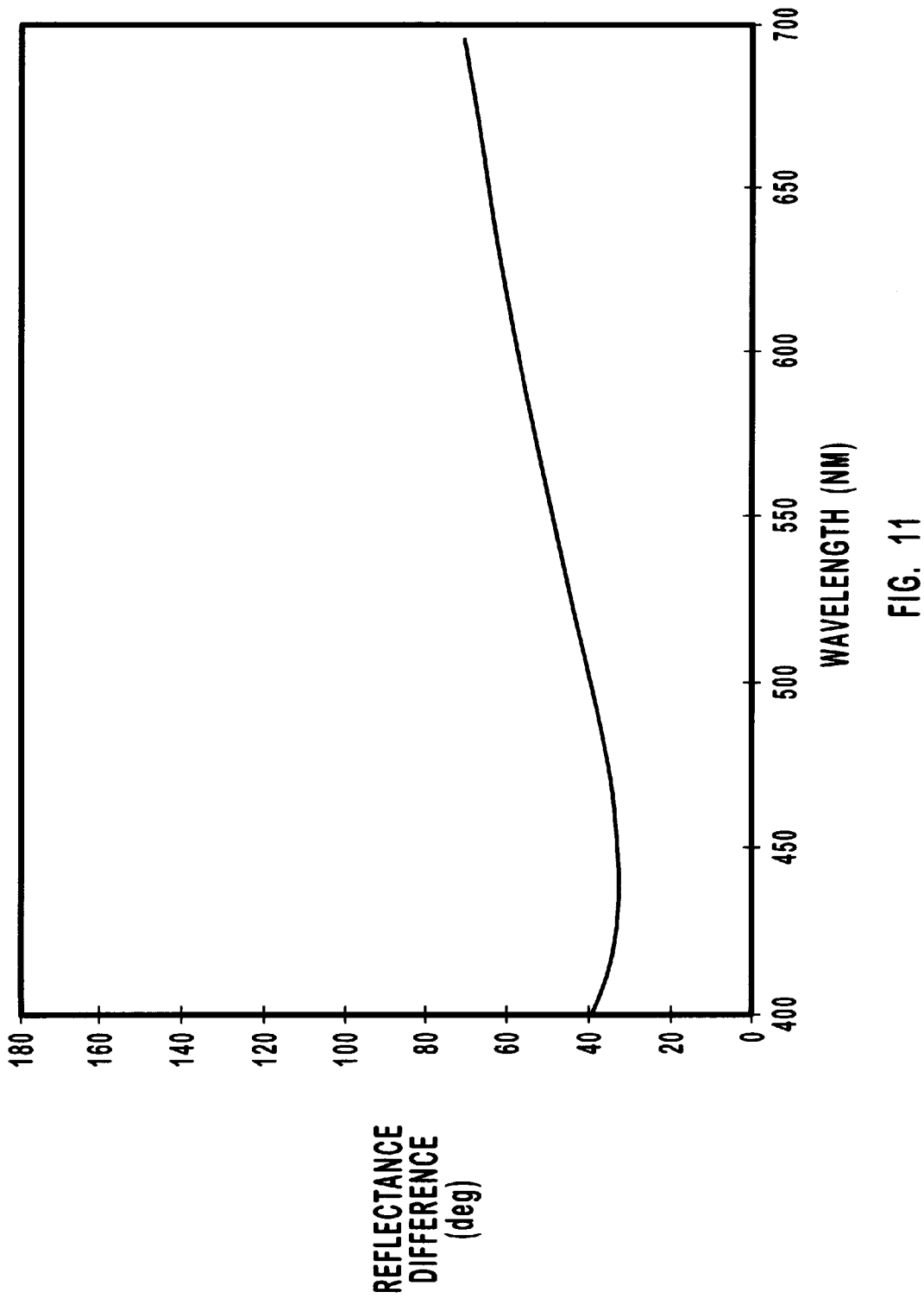
FIG. 11 compares the phase difference, in degrees, between s-polarization and p-polarization states in reflection for the anti-reflection coating on surface 41a for prism R at the total internal reflection angle.
Figure 12:
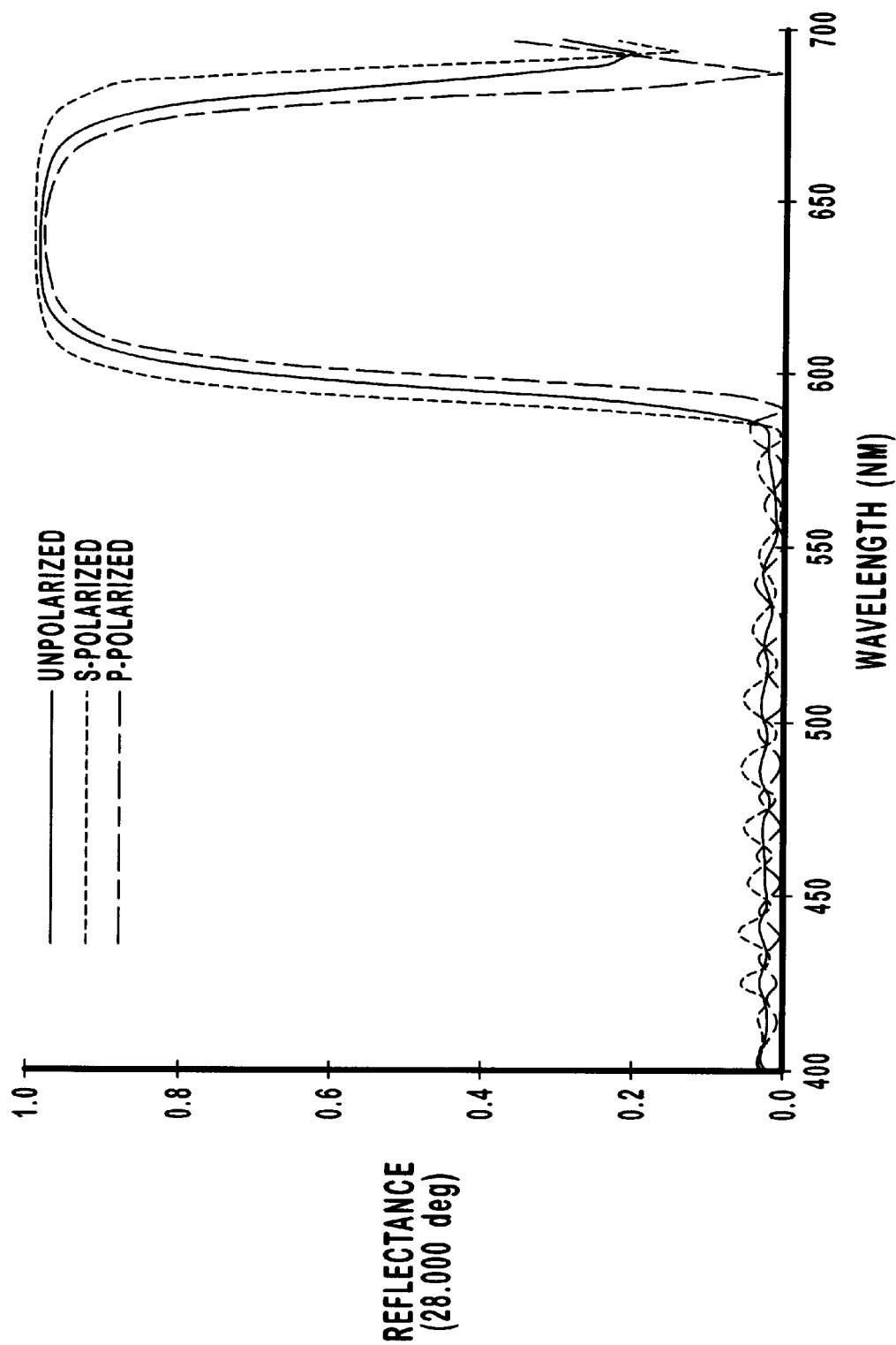
FIG. 12 illustrates the reflectance of the first triangular prism R in FIG. 1 located on surface 41b for wavelengths of light from 400 nm to 700 nm, thus including the visible region. The reflectance of unpolarized, s-polarized and p-polarized light are shown as separate curves for an angle of incidence of 28°.

The phase difference introduced as a result of each coating is charted for variation with wavelength. More specifically, the phase differences introduced by the dichroic coating and antireflection coating on Prism R are shown respectively in FIGS. 11 and 13 and the phase difference introduced by the dichroic coating and antireflection coating on Prism G are shown respectively in FIGS. 18 and 20. Additionally, the spectral performance of these coatings as a function of wavelengths are also charted as shown in FIGS. 10 and 12 for Prism R and in FIGS. 17 and 19 for Prism G. Furthermore, the phase difference variation with angle of incidence for a total internal reflection surface is also provided in FIG. 13. Using the data provided in Examples 3A–3D, one skilled in the art can calculate the optical performance of these interference filters at different angles to determine the optimum correction for a particular illumination system by utilizing the technology disclosed in this application.

A system as shown in FIG. 1 and configured as particularly set forth in Examples 3A–3D yet without waveplate compensators would be expected to yield a contrast ratio of about 30:1. As set forth herein, utilizing waveplate compensators typically increases the contrast ratio by at least one order of magnitude. However, the contrast achieved is also dependent on the coatings utilized, the illumination spectrum, the use of a color tuning filter and whether photoptic weighting is included. Photoptic weighting was assumed, as was the use of a uniform illumination source and a color tuning filter with two notches.

Example 3A

Example 3A and FIGS. 7–13 are related to comparative data for red light passing through a color channel such as the color channel defined by first triangular prism R, waveplate compensator 80 and liquid crystal light valve 90 and also light passing through the same channel without the waveplate compensator. The dichroic coating used to select the red light which forms the red color channel had a center wavelength of about 620 nm.

FIG. 7 is a plot of the ellipticity and rotation values for retarder values ranging from 0 to 0.5 of a retarder at an orientation of 0° of a ray, R4, having a wavelength of 630 nm. As the plot shows, the ellipticity and orientation both have a minimum when the retardance value is about 0.20.

Figure 8:
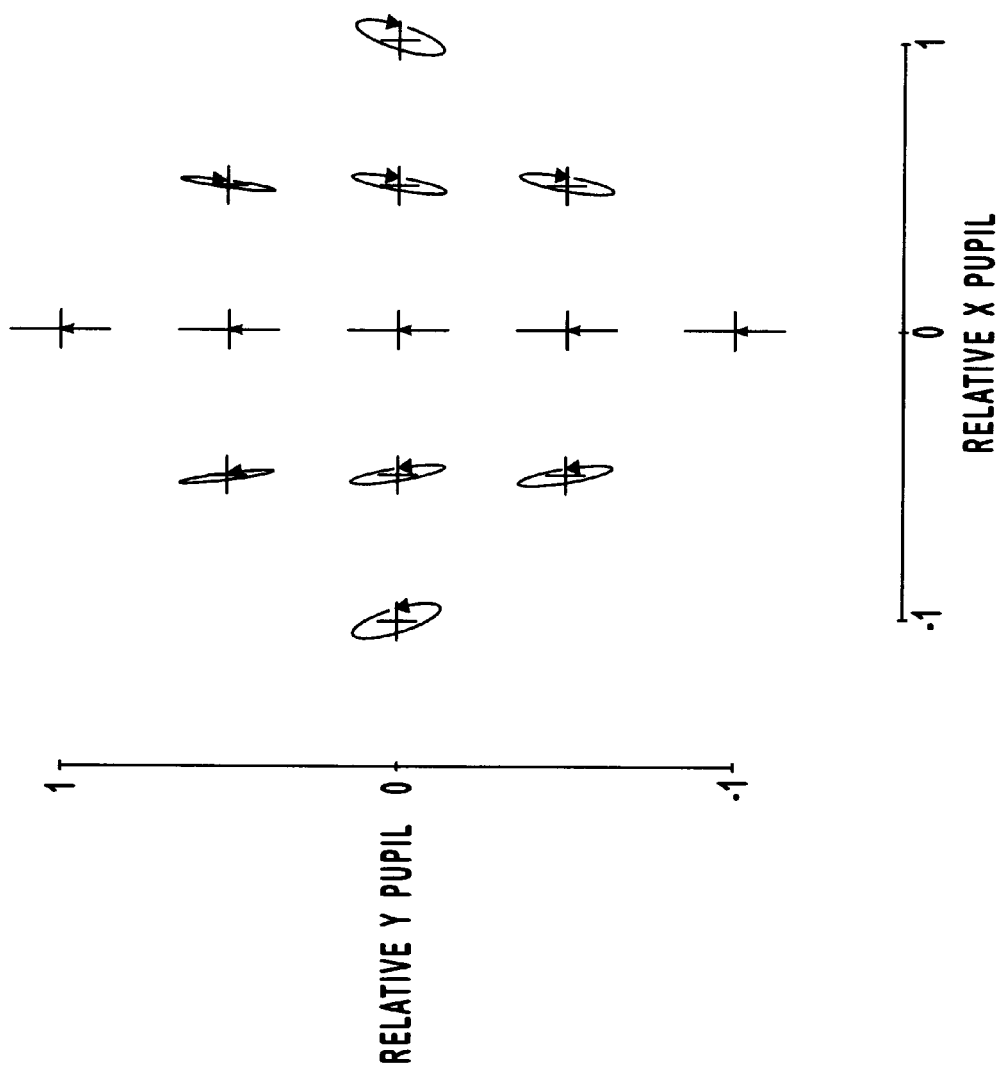
FIG. 8 relates to FIG. 7 and is a pupil map of the polarization state through the first channel, the red light channel, without a compensator plate.

FIG. 8 is a pupil map of the polarization state through the first channel or the red light channel with reference to the particular configuration described in FIG. 1, however, without a waveplate compensator. This represents the "off"-pixel through the display system. The resulting polarization state is a combination of the dichroic coating, antireflection coating and total internal reflection surfaces in the channel. A system with infinite contrast ratio would have no ellipticity and an angle of rotation of zero degrees. In this case, there is a significant ellipticity and orientation at the edge of the pupil at the extreme relative pupil positions. The contrast with uniform spectrum, a color tuning filter, dichroic coatings, standard antireflective coatings and photoptic weighting was 50:1. Note, that the direction of orientation is opposite that of Example 1, the uncoated TIR prism, illustrated in FIG. 4, and slightly larger while the ellipticity is considerably larger.

Figure 9:
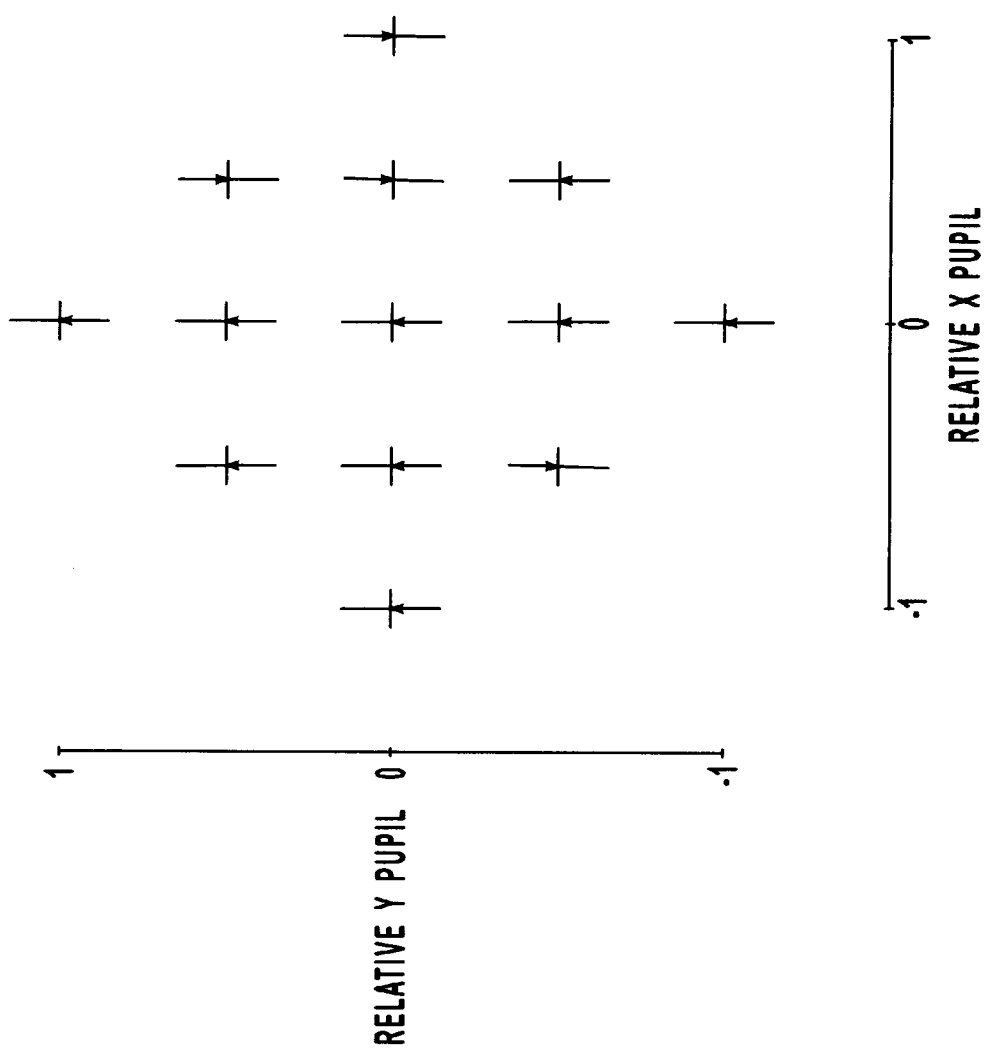
FIG. 9 relates to FIG. 7 and is a pupil map of the polarization state through the red light channel, with a compensator plate having a retardance value of 0.20.

Insertion of a waveplate compensator having a retardance value of 0.20 produces a pupil polarization map as shown in FIG. 9. When the 0.20 waveplate compensator is utilized with uniform spectrum, a color tuning filter, dichroic coatings, standard antireflective coatings and photoptic weighting, the contrast was 678:1.

Figure 13:
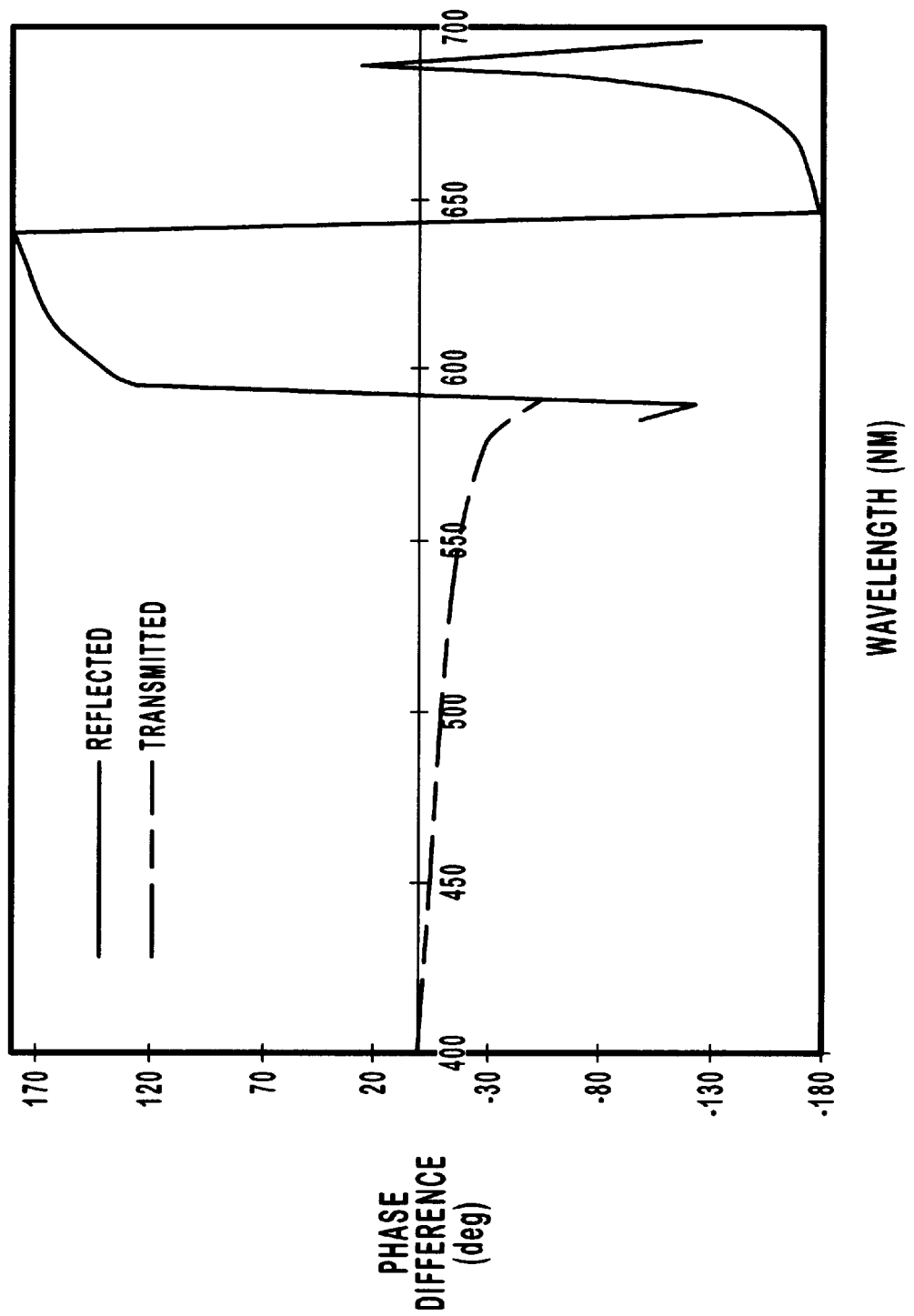
FIG. 13 illustrates the phase difference, in degrees, between s-polarization and p-polarization states for reflected and transmitted light for the dichroic coating on surface 41b of prism R in FIG. 1.

Tables 2 and 3 provided hereinbelow provide the thickness of the thin film layers and the order of deposition of the antireflection coating and dichroic coating respectively located on the first triangular prism R at 42 and 44. FIGS. 10–13 illustrate the key characteristics of the optical performance of the resulting filter for prism R over the range of visible wavelengths from 400 nm to 700 nm. FIGS. 10–11 are related to the antireflection coating and FIGS. 12–13 are related to the dichroic coating. The antireflective coating deposited on surface 41a to yield coating 42 was formed from alternating layers of $Ta_2O_5$ (H) and $SiO_2$ ($L_1$). The coating is applied with the material at the top of the column in Table 2 next to the incident medium and terminates with the material at the bottom of column next to the substrate. The refractive index of the high index material (H), the low index material ($L_1$), the incident media and the substrate were 2.13, 1.45, 1.0 and 1.52. The thickness of material is in nanometers (nm). The sequence and thickness are provided in Table 2.

TABLE 2

| Material | Thickness |
|---|---|
| $L_1$ | 98.62 |
| H | 40.86 |
| $L_1$ | 32.98 |
| H | 23.64 |

FIG. 10 provides the spectral performance of the antireflection coating 42, at normal incidence, as used on surface 41a on prism R. FIG. 11 provides the resulting phase difference over the same wavelength as in FIG. 10 at the triangle.

The dichroic coating deposited on surface 41b to yield coating 44 was formed from alternating layers of $TiO_2$ (H), $ZrO_2$ (L) and $SiO_2$ ($L_1$). The coating is applied with the material at the top of the column in Table 3 next to the incident medium and terminates with the material at the bottom of column next to the substrate. The refractive index of the high index material (H), the low index material (L), the other low index material ($L_1$), the incident media and the substrate were 2.45, 2.00, 1.45, 1.52 and 1.00. The thickness of material is in nanometers (nm). The sequence and thickness are provided in Table 3.

TABLE 3

| Material | Thickness |
| --- | --- |
| H | 92.55 |
| L | 62.32 |
| H | 92.17 |
| L | 57.97 |
| H | 83.54 |
| L | 79.59 |
| H | 70.85 |
| L | 87.00 |
| H | 67.94 |
| L | 87.00 |
| H | 67.94 |
| L | 87.00 |
| H | 67.94 |
| L | 87.00 |
| H | 67.94 |
| L | 87.00 |
| H | 67.94 |
| L | 87.00 |
| H | 67.94 |
| L | 87.00 |
| H | 67.94 |
| L | 87.00 |
| H | 67.94 |
| L | 87.00 |
| H | 67.94 |
| L | 92.32 |
| H | 64.60 |
| L | 95.52 |
| H | 65.55 |
| L | 91.27 |
| H | 76.21 |
| $L_1$ | 86.20 |

FIG. 12 depicts optical performance of the dichroic filter on the first triangular prism R showing the reflection of unpolarized, s-polarized and p-polarized light over the range of visible wavelengths from 400 nm to 700 nm at an angle of 280. The desirable spectral characteristics of this dichroic filter are as follows: 1) the filter has a reflectance near zero, so that it transmits light, from about 400 nm to about 580 nm, 2) the region, starting at about 580 nm, where the reflectance starts to increase rapidly over about a 20 nm range to near 100 percent, designates the cut on wavelength, 3) The s-polarization and p-polarization states are close to overlapping at the cut on the region, but do not have the same reflectance value until about 630 nm, at which both polarization states have a maximum reflectance close to 100 percent. In the ideal case, the s-polarization and p-polarization state reflectance would overlap completely at the cut on wavelength to the maximum reflectance value defining the red channel. While this can be done at a single angle of incidence, in practice some compromise must be made over the range of cone angles representing the incident illumination.

FIG. 13 illustrates the resulting phase difference between the s-polarization and p-polarization states over the same wavelength range in FIG. 12. The phase difference in transmission is relatively constant, between zero and (–) 30° over the dichroic coatings low reflection, high transmission, region of 400 nm to about 580 nm. At the cut on wavelength the phase difference undergoes a transition changing from about (–) 50° to about (+) 130°, then decreasing in slope over the region of high reflection, about 600 nm to 680 nm. The waveplate compensator is effective for the latter range of wavelengths in the red color channel, where the phase difference is relatively constant with wavelength.

FIG. 12 illustrates the desired reflection of the s and p polarization components required to obtain a high brightness and contrast image. This filter, for the red channel, has a pass or low reflection region from 450 up to 580 nm where a transition occurs to a "stop" or high reflection wavelength range. In the preferred embodiments of this invention, the wavelength range of the transition region is narrow and the reflectivity is as high as possible in the "stop" region and zero in the "pass" such that the red image channel information does not receive the contribution from corresponding pixels in the green or blue channels. Furthermore, the coatings are ideally non-polarizing at the angle of incidence for the nominal rays. Accordingly, the s and the p-polarization components of transmitted light should overlap starting at the transition region continuing on through the "stop" band. Optimizing the non-polarizing characteristics results in the maximum display brightness. Both the s-polarization and p-polarization states must be reflected to exit the prism and be transmitted by a polarization selecting element for projection to the viewing screen, therefore, the average transmitted intensity is proportional to the product of the s and p reflectivities at a given wavelength. Several design methods can be used to achieve non-polarizing dichroic coatings, however, the non-polarizing characteristic is limited to a fixed angle of incidence. In practice, the system must be optimized to deal with the range of divergent angles. This requires a compromise between two characteristic properties of interference coatings at increasing angles of incidence, 1) the shift of the spectral curve shape towards shorter wavelengths, and 2) increased separation between the s-polarization and p-polarization states. This compromise can be made without significant deterioration to image contrast and brightness by removing the polarizing transition region to gain a broad wavelength region used to achieve the channels characteristic color. Example 3D sets forth a technique for achieving this objective.

Example 3B

This example and FIGS. 14–20 are related to comparative data for green light passing through a color channel such as the color channel defined by second triangular prism G, waveplate compensator 100 and liquid crystal light valve 110 and also light passing through the same channel without the waveplate compensator. The dichroic coating used in prism G, for the green channel, has a center wavelength of about 540 nm.

FIG. 14 is a plot of the ellipticity and rotation values for retarder values ranging is from 0 to 0.5 of a retarder at an orientation of 0° of a ray, R4, at a wavelength of 550 nm. As the plot shows, the ellipticity and orientation both have a minimum when the retardance value is about 0.20. The ellipticity and orientation also both have approximately a minimum at a retardance value of 0.20.

Figure 15:
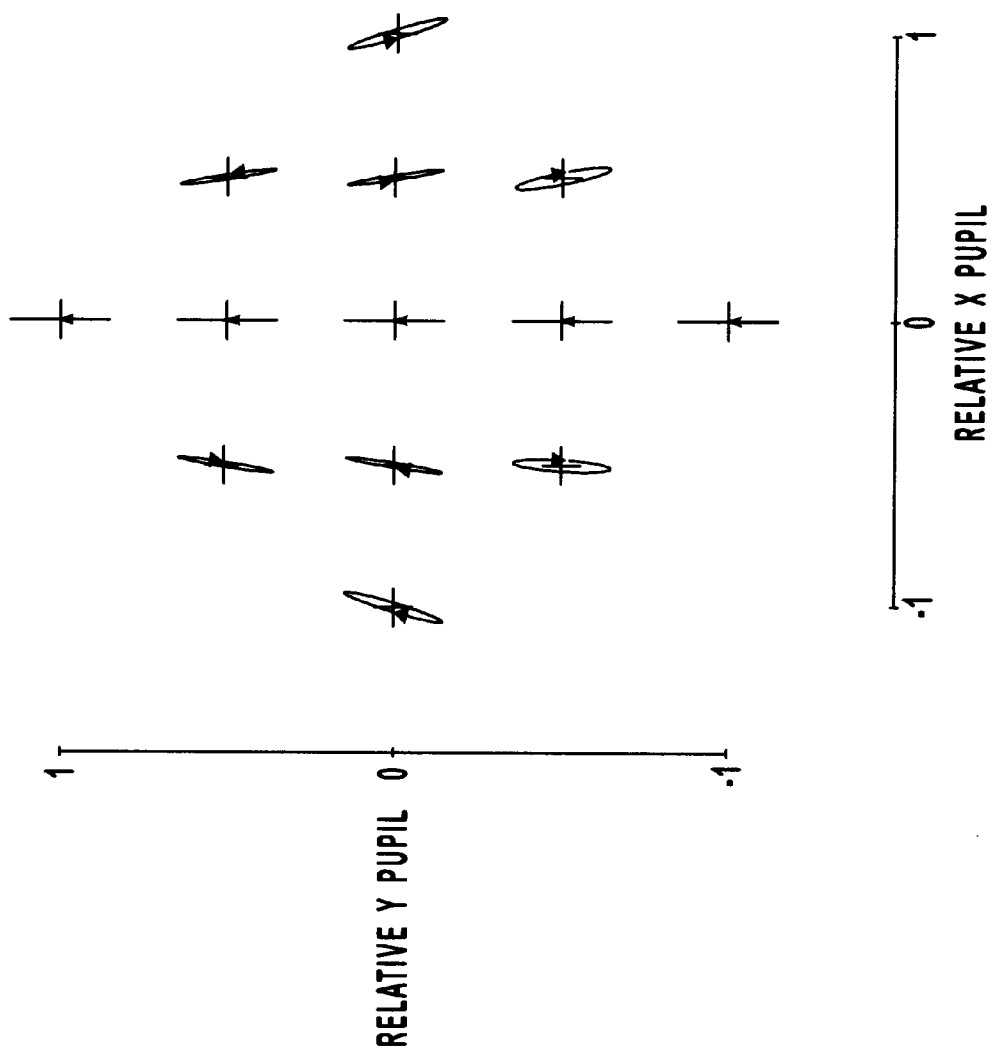
FIG. 15 relates to FIG. 14 and is a pupil map of the polarization state through the second channel, the green light channel, without a compensator plate.

FIG. 15 is a pupil map of the polarization state through the green light channel with reference to the particular configuration described in FIG. 1. This represents the "off"-pixel through the display system. The resulting polarization state is a combination of the dichroic coating, antireflection coating and total internal reflection surfaces in the channel. A system with infinite contrast ratio would have no ellipticity and an angle of rotation of zero degrees. In this case, there is a slight ellipticity at the edge of the pupil as well as relatively large orientation, with respect to the prism R, the pupil diagram illustrated in FIG. 8. The contrast with uniform spectrum, a color tuning filter, dichroic coatings, standard antireflective coatings and photoptic weighting was 24:1.

Figure 16:
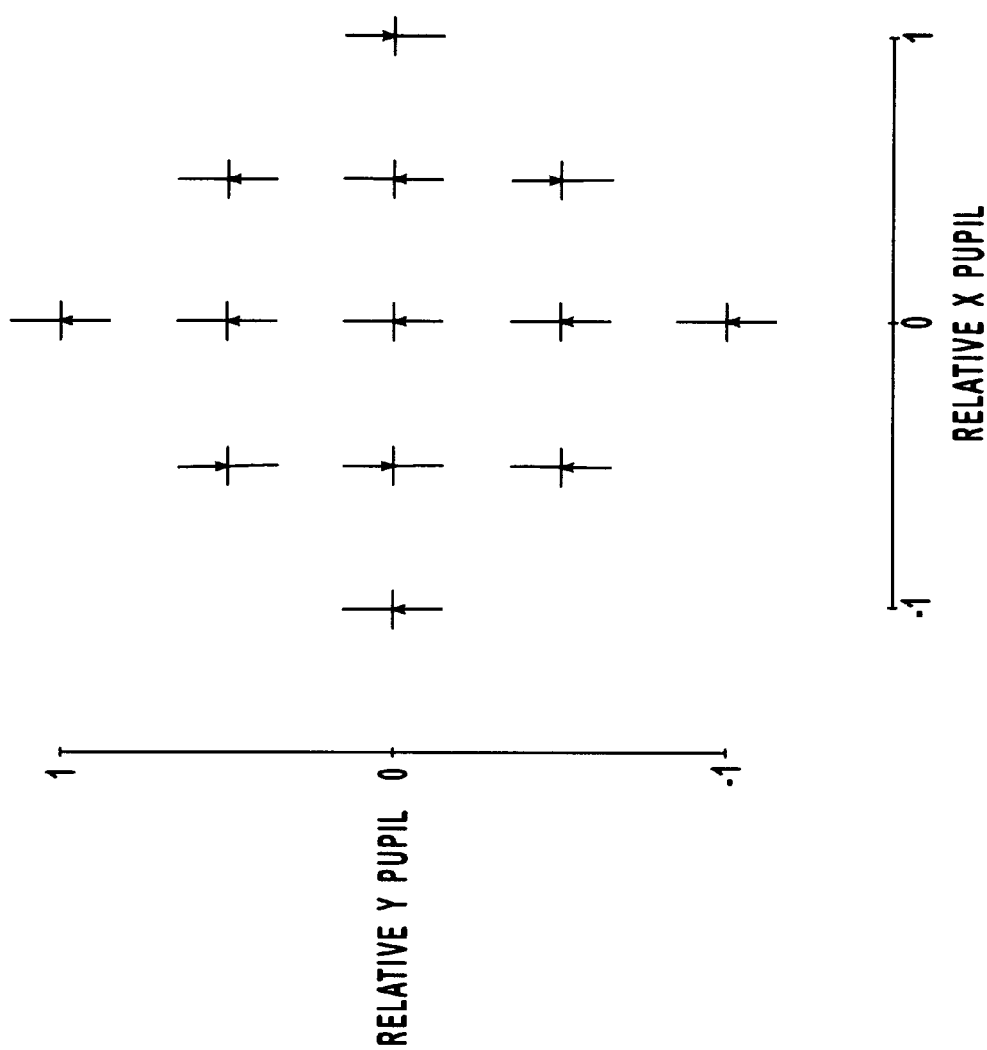
FIG. 16 relates to FIG. 14 and is a pupil map of the polarization state through the green light channel, with a compensator plate having a retardance value of 0.20.

Insertion of a waveplate compensator having a retardance value of 0.20 produces a pupil polarization map as shown in FIG. 16. When the 0.20 waveplate compensator is utilized with uniform spectrum, a color tuning filter, dichroic coatings, standard antireflective coatings and photoptic weighting, the contrast was 538:1.

Figure 17:
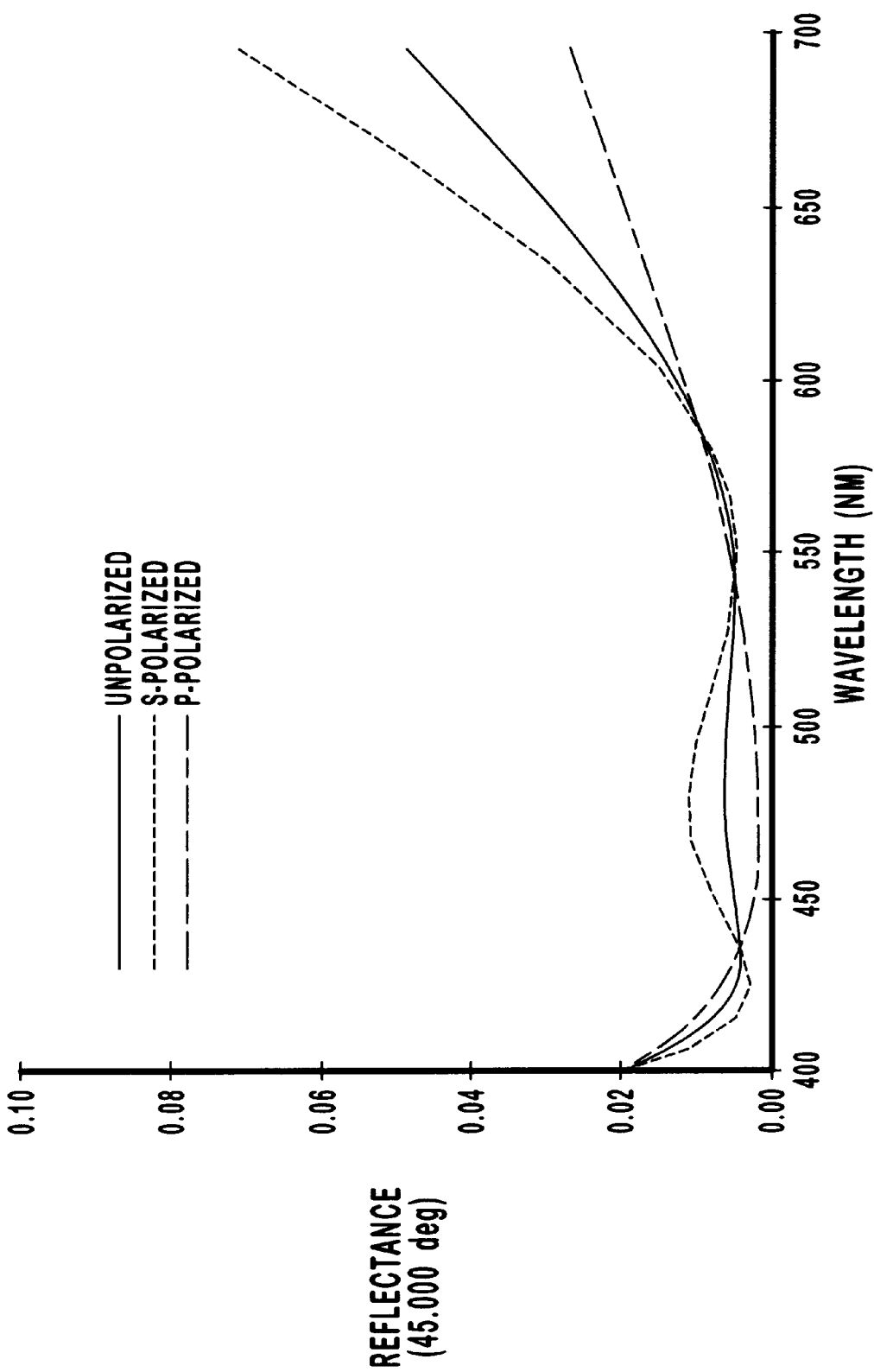
FIG. 17 illustrates the calculated reflectance for unpolarized, s-polarized and p-polarized light at 45° angle of incidence of the anti-reflection coatings on surface 51a of prism G in FIG. 1, from 400 nm to 700 nm.
Figure 18:
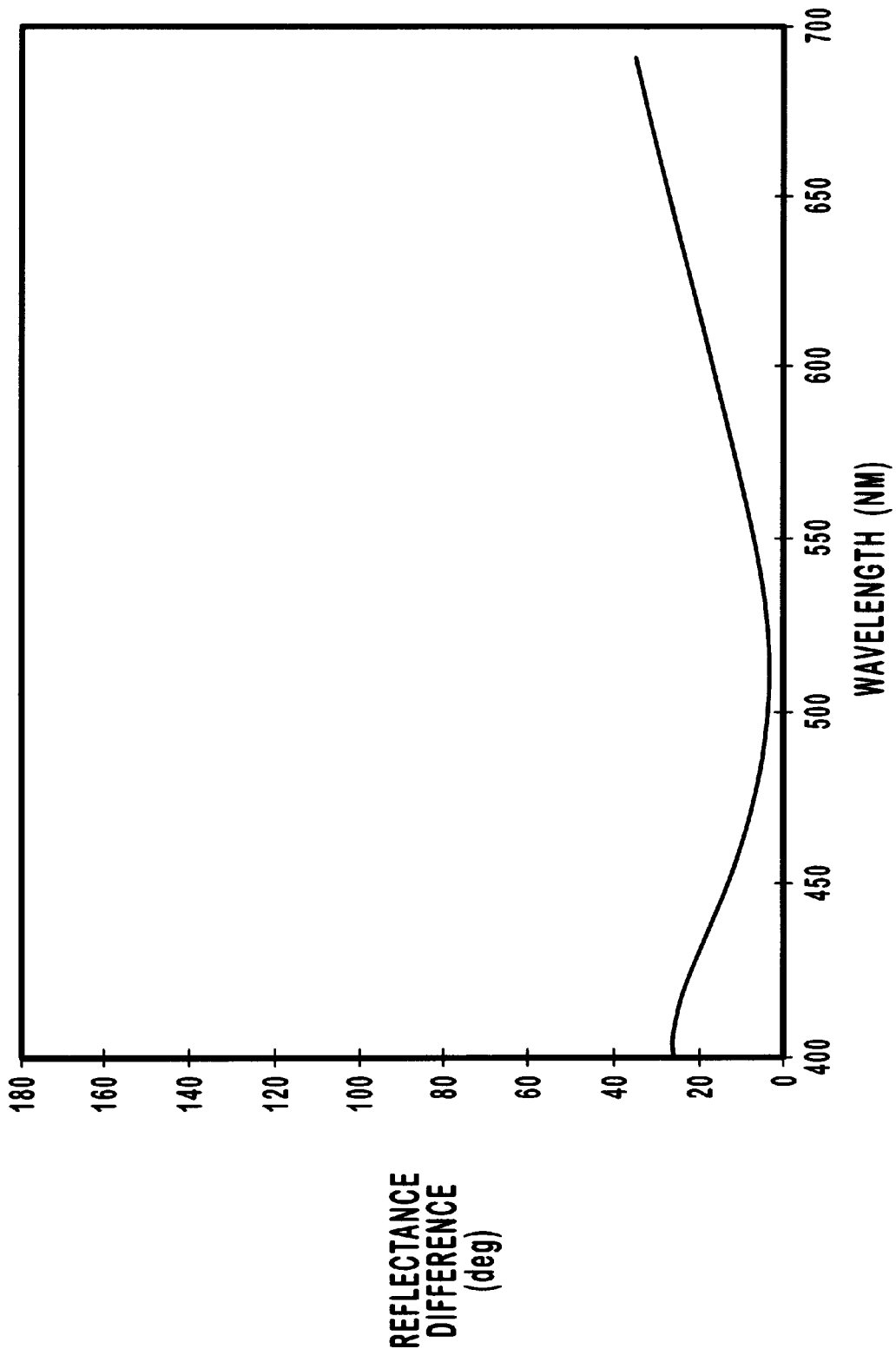
FIG. 18 compares the phase difference, in degrees, between s-polarization and p-polarization states in reflection for the anti-reflection coatings on surface 51a for prism G at the total internal reflection angle.
Figure 19:
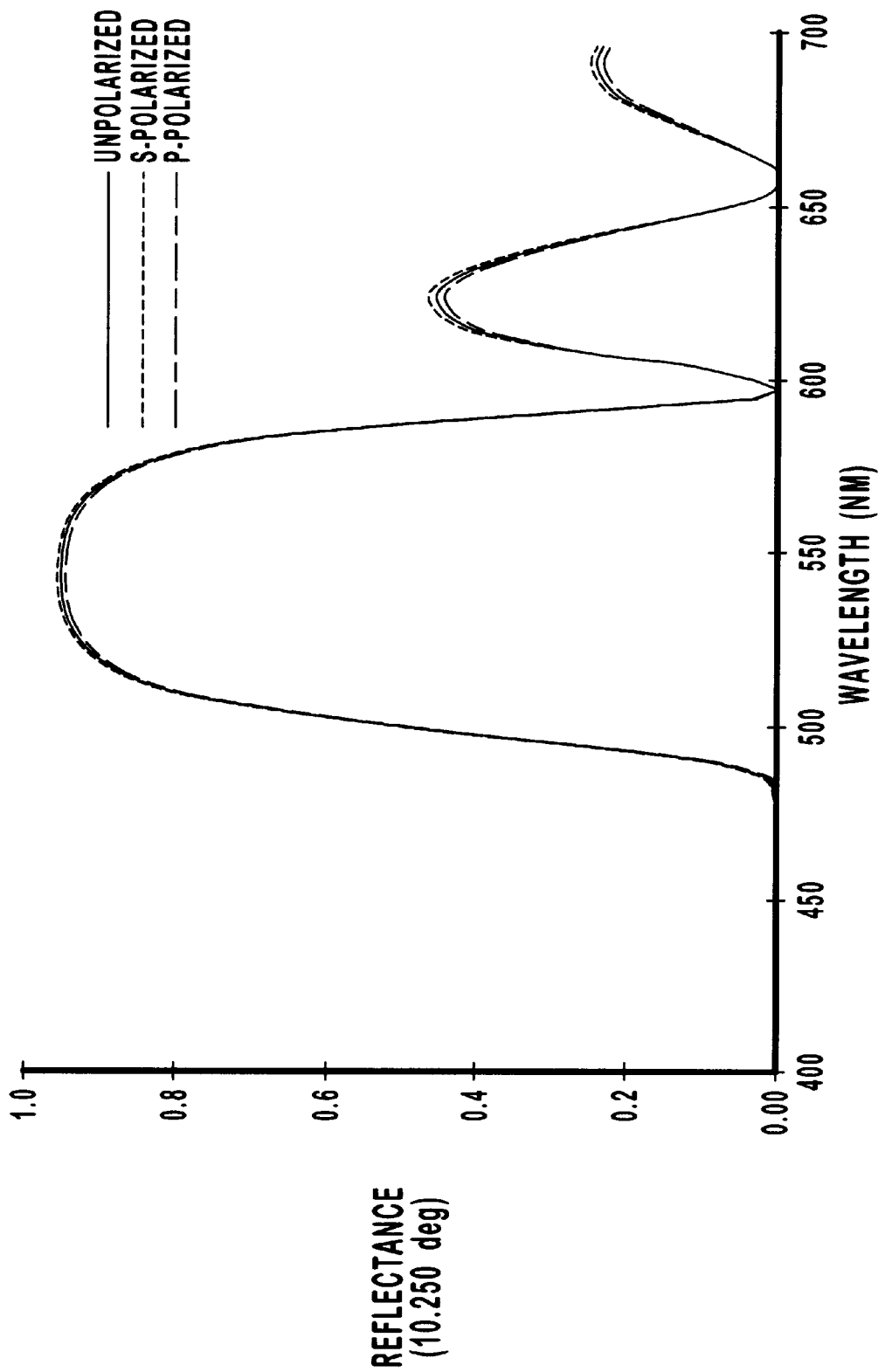
FIG. 19 illustrates the reflectance of the second triangular prism G in FIG. 1 located on surface 51b for wavelengths of light from 400 nm to 700 nm, thus including the visible region. The reflectance of unpolarized, s-polarized and p-polarized light are shown as separate curves for an angle of incidence of 10.25°.
Figure 20:
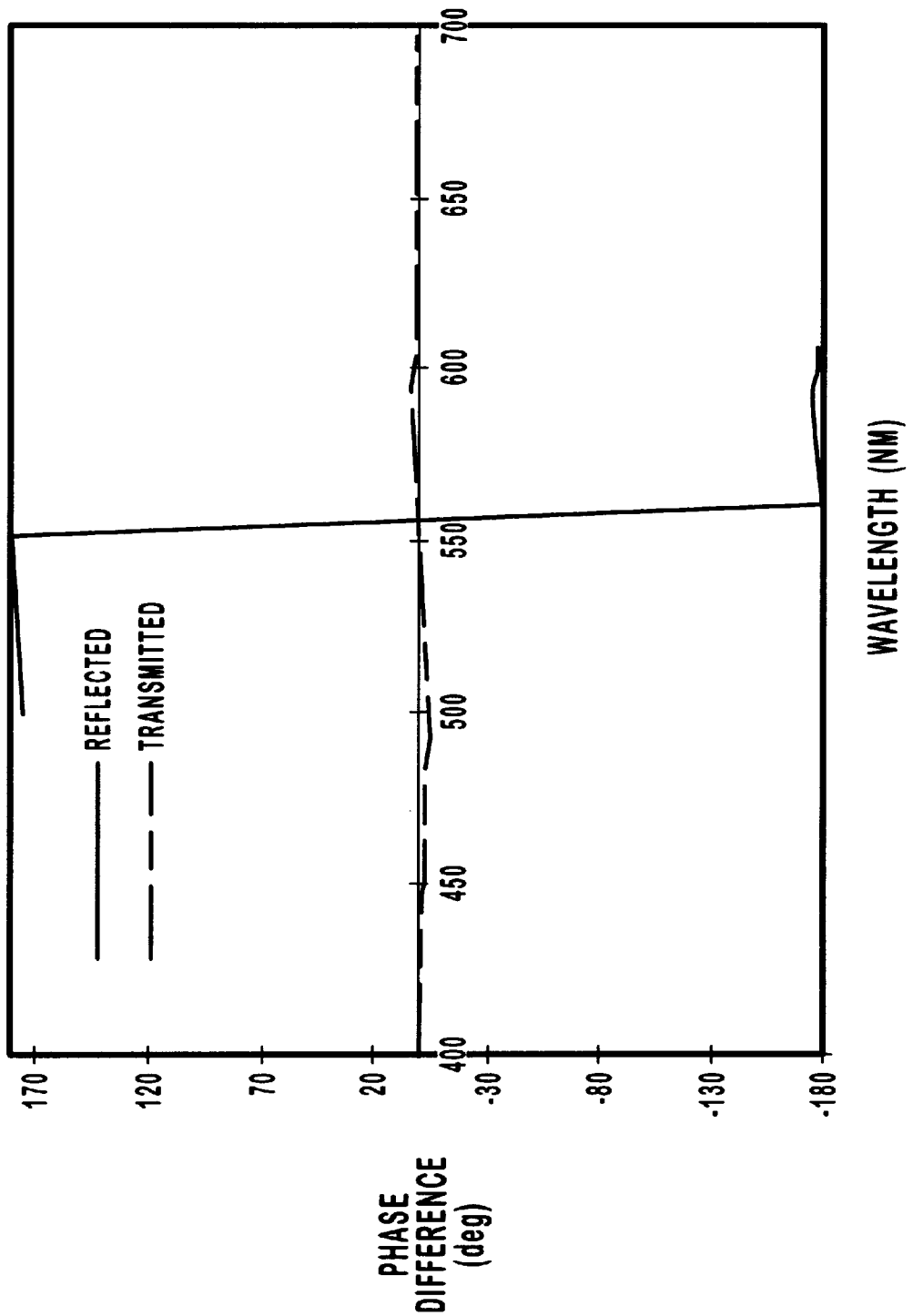
FIG. 20 illustrates the phase difference, in degrees, between s-polarization and p-polarization states for reflected and transmitted light for the dichroic coating on surface 51a of prism G in FIG. 1.

Tables 4 and 5 provided hereinbelow provide the thickness of the thin film layers and the order of deposition of the antireflection coating and dichroic coating respectively located on the second triangular prism G at 52 and 54. FIGS. 17–20 illustrate the key characteristics of the optical performance of the resulting filter for prism G over the range of visible wavelengths from 400 nm to 700 nm. FIGS. 17–18 are related to the antireflection coating and FIGS. 19–20 are related to the dichroic coating.

The antireflective coating deposited on surface 51$a$ to yield coating 52 was formed from alternating layers of $Ta_2O_5$ (H) and $SiO_2$ ($L_1$). The coating is applied with the material at the top of the column in Table 4 next to the incident medium and terminates with the material at the bottom of the column next to the substrate. The refractive index of the high index material (H), the low index material ($L_1$), the incident media and the substrate were 2.13, 1.45, 1.0 and 1.52. The thickness of material is in nanometers (nm). The sequence and thickness are provided in Table 4.

TABLE 4

| Material | Thickness |
|---|---|
| $L_1$ | 98.32 |
| H | 59.72 |
| $L_1$ | 25.38 |
| H | 24.98 |

FIG. 17 provides the spectral performance of antireflection coating 52 on surface 51$a$ at 45° incidence, representing the chief ray entering prism G after passing through the dichroic coating 44 on surface 41$b$ of prism R. Under these conditions there is a difference in intensity between the s-polarization and p-polarization vectors, as well as a wavelength dependent phase, which is provided in FIG. 18.

The dichroic coating deposited on surface 51$b$ to yield coating 54 was formed from alternating layers of $TiO_2$ (H) and $ZrO_2$ (L). The coating is applied with the material at the top of the column in Table 5 next to the incident medium and terminates with the material at the bottom of the column next to the substrate. The refractive index of the high index material (H), the low index material (L), the incident media and the substrate were 2.45, 2.00, 1.52 and 1.52. The thickness of material is in nanometers (nm). The sequence and thickness are provided in Table 5.

TABLE 5

| Material | Thickness |
|---|---|
| L | 38.33 |
| H | 54.56 |
| L | 70.12 |
| H | 57.77 |
| L | 70.33 |
| H | 52.55 |
| L | 70.90 |
| H | 53.90 |
| L | 67.51 |
| H | 53.90 |
| L | 67.51 |
| H | 53.90 |
| L | 67.51 |

TABLE 5-continued

| Material | Thickness |
|---|---|
| H | 53.90 |
| L | 67.51 |
| H | 53.90 |
| L | 70.91 |
| H | 52.55 |
| L | 70.34 |
| H | 57.78 |
| L | 70.12 |
| H | 54.55 |
| L | 38.32 |

FIG. 19 depicts optical performance of the dichroic filter on the second triangular prism G showing the reflection of unpolarized, s-polarized and p-polarized light over the range of visible wavelengths from 400 nm to 700 nm at an angle of 10.250°. FIG. 20 illustrates the resulting phase difference between the s-polarization and p-polarization states over the same wavelength range in FIG. 19.

Example 3C

This example and FIGS. 21–22 are related to data for blue light passing through a color channel such as the color channel defined by first quadrangular prism B and liquid crystal light valve 130 without a waveplate compensator such as waveplate compensator 120. The blue light had wavelength of about 450 nm.

FIG. 21 is a plot of the ellipticity and rotation values for retarder values ranging from 0 to 0.5 of a retarder at an orientation of 0° of a ray, R4, at a wavelength of 450 nm. As the plot shows, the ellipticity and orientation are near zero over the entire retardation range.

FIG. 22 is a pupil map of the polarization state through the third channel or the blue light channel with reference to the particular configuration described in FIG. 1, however, without a waveplate compensator. In this case, there is no ellipticity or orientation. The contrast with uniform spectrum, a color tuning filter, zero phase dichroic coatings, standard antireflective coatings and photoptic weighting was 3000:1. Accordingly, a waveplate compensator is not required.

Example 3D

Example 3D provides data related to the performance of a color tuning filter utilized in the system described in Examples 3A–3C. Such a color tuning filter may be utilized at a location in the system to filter the incoming light. The notches, low transmittance regions, of the filter are designed to correspond to the transition zones of the dichroic coatings. More specifically, the notches of the filter are designed to correspond to the transition zones of the dichroic coatings such as the dichroic coating in the red channel described in Example 3A, as will be set forth below in further detail. Preferably, the filter is located in the region of illumination as shown in FIG. 1 at 12. The characteristics of the notch filter are selected to operate with the preferred dichroic filters such that the correcting effect of the waveplate compensator is maximized for contrast of each color channel.

Figure 23:
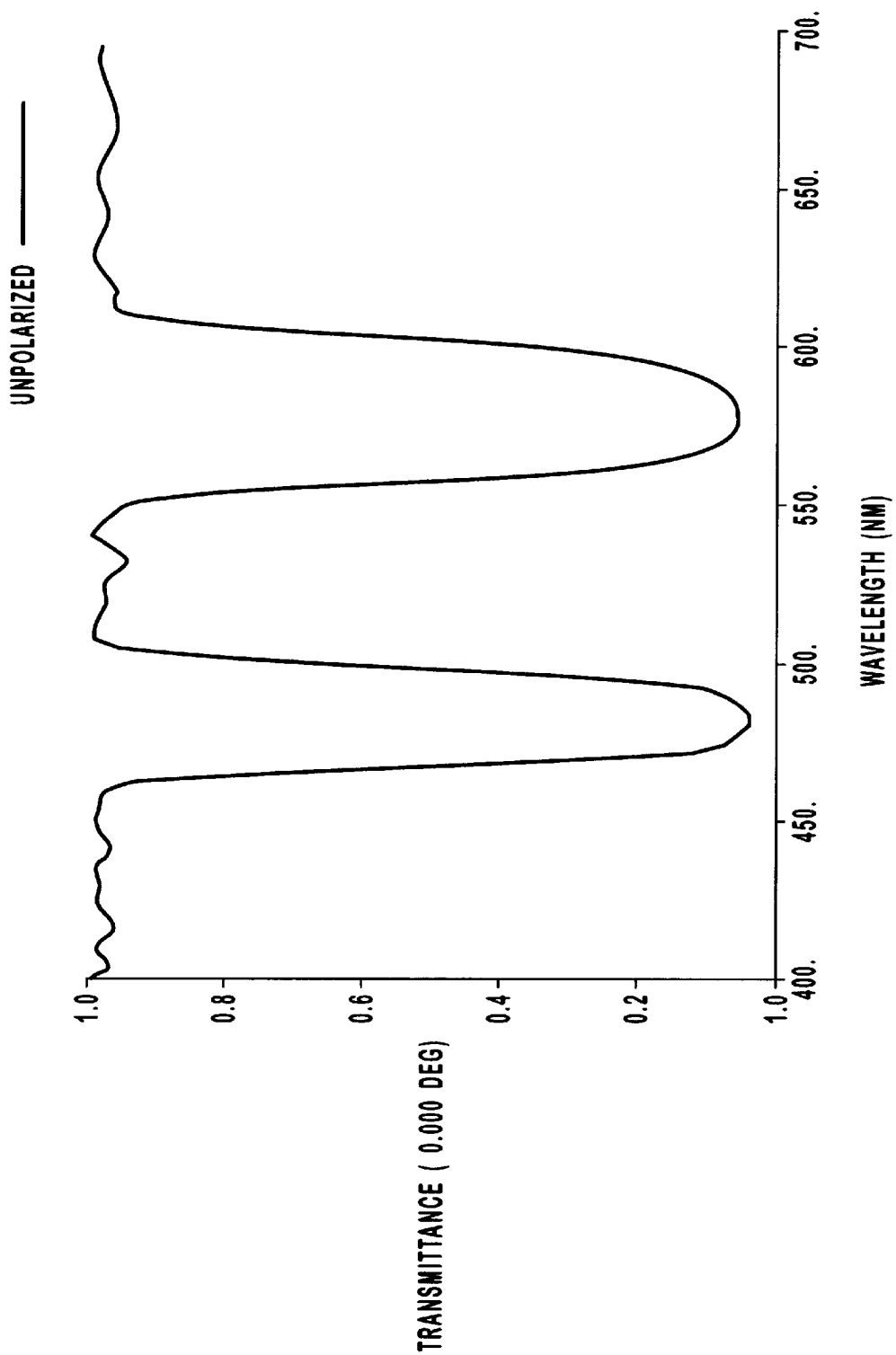
FIG. 23 illustrates the spectral performance characteristics of the notch filter as the calculated transmittance at normal incidence for unpolarized light from 400 nm to 700 nm.

Preferably, the notch filter has a very steep slope from the cut on to its first peak wavelength, to selectively remove only the limited range of wavelengths so as not to degrade the brightness of the selected color channel. In a more preferred embodiment, the notch filter further defines the wavelength ranges of each color channel to provide the proper color purity and to insure that it is not compromised by chromatic variations in the light source. It is most preferred to utilize a single filter element that corrects for all color channels. The most preferred filter element is a thin film interference coating notch filter, the spectral performance of which is depicted in FIG. 23. This filter has the same spectral performance in transmission for unpolarized light, s-polarized light and p-polarized light for the notch filter, since it is used at normal incidence. The interference notch filter has an extremely narrow transition region which is positioned at a wavelength such that the portion of the reflected wavelengths which are not correctable with a waveplate compensator are blocked and do not effect the image contrast or brightness. The notch filter rejects the cut on region wavelengths, which cannot be corrected by the waveplate compensator due to the change in phase difference. The notch filter permits the use of non zero phase difference dichroic filters to selectively limited wavelength regions.

Interference notch filters are preferred over absorbing color filters. Absorbing color filters have broad rather than steep slopes required for very selective rejection. One notch filter can be used for the entire display device, since interference filters can be made with narrow notch widths and steep slopes for the selective rejection of the transition zones in the dichroic filters. However, separate absorbing filters may be inserted in each color channel. The filter in FIG. 23 is exemplary of these characteristics, having less than 10 percent transmission for the region of about 575–600 nm, 50 percent transmission at 610 nm and greater than 95 percent transmission up to about 680 nm.

FIGS. 19 and 20 illustrates the spectral characteristics of the dichroic filter 54 on surface 51b for the second triangular prism G that act in cooperation with the preferred notch filter over the range of visible wavelengths from 400 nm to 700 nm as shown in FIG. 23, to obtain a high brightness and contrast image. The notch filter also defines the blue channel having about 95 percent transmission from about 400 to 465 nm. Thus, it can be seen that the transition regions of the dichroic coatings, which have changes in reflected phase difference do not interfere with the image contrast, being blocked by the stop bands in the notch filter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A waveplate compensator for use in an image projection system which utilizes color splitting means for separating a polarized component of light into at least two separate color beams, the waveplate compensator comprising:
   a birefringent material having a thickness,
      said waveplate compensator having a retardance which is dependent on the birefringent material and the thickness of the birefringent material,
      said retardance being selected to retard a color beam by a wave value at which an approximate minimum occurs for both ellipticity and elliptical polarization orientation of the color beam as caused by polarization rotation of a portion of the color beam by a color splitting means,
      whereby placement of the waveplate compensator in the optical path between a color splitting means and an imaging means substantially eliminates any portion of light that undergoes polarization rotation by the color splitting means.

2. A waveplate compensator as recited in claim 1, wherein the birefringent material is selected from the group consisting of quartz, calcite, mica.

3. A waveplate compensator as recited in claim 1, wherein the birefringent material is an organic polymeric plastic having different indices of refraction for different crystallographic axes.

4. A waveplate compensator as recited in claim 1, wherein the birefringent material is a liquid crystal cell.

5. A waveplate compensator as recited in claim 1, wherein the waveplate compensator means sufficiently eliminates any portion of light that undergoes polarization rotation by a color splitting means in a reflective imaging system that the resulting contrast ratio of the system is at least about an order of magnitude greater than a contrast ratio of the same reflective imaging system without a waveplate compensator.

6. A waveplate compensator as recited in claim 1, wherein the waveplate compensator is configured to be positioned in an optical path between a beam exit location of a color splitting means and an imaging means.

7. A waveplate compensator as recited claim 1, wherein the waveplate compensator is configured to be coupled to a color splitting means.

8. A waveplate compensator as recited claim 1, wherein the waveplate compensator is configured to be coupled to an imaging means.

9. A waveplate compensator as recited in claim 1, wherein the waveplate compensator is substantially separated from the image plane.

10. A waveplate compensator for use in an image projection system which utilizes color splitting means for separating a polarized component of light into at least two separate color beams, the waveplate compensator comprising:
    a birefringent material having a thickness,
       said waveplate compensator having a retardance which is dependent on the birefringent material and the thickness of the birefringent material,
       said retardance being selected to retard a color beam by a wave value which corresponds with a calculated polarization rotation elimination retardance value,
       said calculated polarization rotation elimination retardance value being the value at which both ellipticity and elliptical polarization orientation of the color beam as caused by polarization rotation of a portion of the color beam by a color splitting means are both at approximately a minimum,
       whereby placement of the waveplate compensator in the optical path between a color splitting means and an imaging means substantially eliminates any portion of light that undergoes polarization rotation by the color splitting means.

11. A waveplate compensator as recited in claim 10, wherein the birefringent material is selected from the group consisting of quartz, calcite, mica.

12. A waveplate compensator as recited in claim 10, wherein the birefringent material is an organic polymeric plastic having different indices of refraction for different crystallographic axes.

13. A waveplate compensator as recited in claim 10, wherein the birefringent material is a liquid crystal cell.

14. A waveplate compensator as recited in claim 10, wherein the waveplate compensator means sufficiently eliminates any portion of light that undergoes polarization rotation by a color splitting means in a reflective imaging system that the resulting contrast ratio of the system is at least about an order of magnitude greater than a contrast ratio of the same reflective imaging system without a waveplate compensator.

15. A waveplate compensator as recited in claim 10, wherein the waveplate compensator is configured to be positioned in an optical path between a beam exit location of a color splitting means and an imaging means.

16. An image projection system comprising:
   (a) polarizing means for polarizing light to transmit a first polarized component of light in a first polarization state;
   (b) color splitting means for separating the first polarized component of light into three primary color beams including a red beam, a green beam, and a blue beam,
      (i) wherein each of the three beams exits primarily in the first polarization state from the color splitting means at three separate beam exit locations,
      (ii) wherein said color splitting means causes at least one of the three beams to have residual elliptical polarization due to polarization rotation of a portion of the beam such that at least one of the three beams has an ellipticity and an elliptical polarization orientation;
   (c) three imager means for modulating a polarization state of each of the three primary color lights,
      (i) wherein the three imager means are positioned such that each imager means receives one of the three primary color beams; and
   (d) at least one waveplate compensator means for retarding at least one of the three primary color beams to achieve a predetermined phase difference,
      (i) wherein the waveplate compensator means is positioned such that the waveplate compensator means is in an optical path between one of the three light exit locations of the color splitting means and one of the three imager means,
      (ii) wherein the waveplate compensator means has a retardance selected to retard the respective primary color beam by a wave value at which both the ellipticity and the elliptical polarization orientation of the respective beam are approximately at a minimum, thereby substantially eliminating any portion of light that undergoes polarization rotation by said color splitting means.

17. A system as recited in claim 16, further comprising light source means for providing light to the polarizing means.

18. A system as recited in claim 16, wherein the light has wavelength ranges and wherein the system further comprises notch filter means for tuning the wavelength ranges of the light such that the light entering the color splitting means has selected wavelength ranges.

19. A system as recited in claim 16, wherein the light has wavelength ranges and wherein the system further comprises notch filter means for tuning the wavelength ranges of the light such that the notch filter reflects incidental light at wavelengths having substantially non-constant phase retardance and substantially transmits light having a substantially constant phase retardance.

20. A system as recited in claim 16, wherein the polarizing means is a polarizing beam splitter.

21. A system as recited in claim 16, wherein the polarizing means is a polarizing cubic beam splitter.

22. A system as recited in claim 16, wherein the color splitting means is a Philips prism having at least one surface with a dichroic coating.

23. A system as recited in claim 16, wherein the color splitting means is a Philips prism having at least one surface with a dichroic coating with a nonzero phase retardance.

24. A system as recited in claim 16, wherein the color splitting means is a Philips prism having at least one surface with a dichroic coating with a nonzero phase retardance and a substantially constant phase retardance for the wavelength of light encountering the dichroic coating.

25. A system as recited in claim 16, wherein the color splitting means is selected from the group consisting of beamsplitter cubes, X-prisms, L-prisms, and flat tilted plate dichroic mirrors.

26. A system as recited in claim 16, wherein the three imager means are three liquid crystal light valves.

27. A system as recited in claim 16, wherein the waveplate compensator means is a waveplate compensator formed from a birefringent material.

28. A system as recited in claim 16, wherein the waveplate compensator means is formed from a material selected from the group consisting of quartz, calcite, mica, organic polymeric plastics having different indices of refraction for different crystallographic axes, and a liquid crystal cell.

29. A system as recited in claim 16, wherein the at least one waveplate compensator means is coupled to the color splitting means.

30. A system as recited in claim 16, wherein the at least one waveplate compensator means is coupled to the imager means.

31. A system as recited in claim 16, wherein the at least one waveplate compensator means sufficiently eliminates any portion of light that undergoes polarization rotation by said color splitting means such that the resulting contrast ratio of said reflective imaging system is at least about an order of magnitude greater than a contrast ratio of a reflective imaging system such as said reflective imaging system without polarization correction means.

32. A system as recited in claim 16, wherein the at least one waveplate compensator means comprises at least two waveplate compensators, and wherein each waveplate compensator has a wave value specifically determined in relation to the respective beam received by each waveplate compensator.

33. A system as recited in claim 16, wherein said retardance of said at least one wave compensating means is selected based on polarization vector modifying characteristics of said color splitting means.

34. A system as recited in claim 16, wherein said retardance of said at least one wave compensating means is selected based on polarization vector modifying characteristics of said polarizing means and said color splitting means.

35. A system as recited in claim 16, further comprising a convergent light source, wherein said retardance of said at least one wave compensating means is selected based on polarization vector modifying characteristics of said convergent light source, said polarizing means, and said color splitting means.

36. A system as recited in claim 16, wherein the polarizing means and the color separation element impart a dispersion in retardance, and wherein the at least one waveplate compensator means has a dispersion in retardance substantially equal to the dispersion in phase retardance imparted by the polarizing means and the color separation element.

37. A system as recited in claim 16, wherein said first polarized component of light comprises a plurality of skew rays each having a first polarization vector, the skew rays having been directionally modified by said polarizing means, and wherein the at least one waveplate compensator means modifies the polarization state of the skew rays passing therethrough, such that a second component of light having a second polarization state enters into the color splitting element with each skew ray having a second polarization vector substantially orthogonal to the first polarization vector of the respective skew ray.

38. An image projection system comprising:
(a) polarizer for polarizing light to transmit a first polarized component of light in a first polarization state;
(b) color splitter for separating the first polarized component of light into three primary color beams including a red beam, a green beam, and a blue beam,
   (i) wherein each of the three beams exits primarily in the first polarization state from the color splitter at three separate beam exit locations,
   (ii) wherein said color splitter causes at least one of the three beams to have residual elliptical polarization due to polarization rotation of a portion of the beam such that at least one of the three beam has an ellipticity and an elliptical polarization orientation;
(c) three reflective imagers for modulating a polarization state of each of the three primary color lights and for reflecting the beam thus modulated,
   (i) wherein the three reflective imagers are positioned such that each reflective imager receives one of the three primary color beams and reflects the respective beam in a second polarization state back into the color splitter; and
(d) at least one waveplate compensator for retarding at least one of the three primary color beams to achieve a predetermined phase difference.
   (i) wherein the waveplate compensator is positioned in an optical path between one of the three light exit locations of the color splitter and one of the three reflective imagers,
   (ii) wherein the waveplate compensator has a retardance selected to retard the respective primary color beam by a wave value at which both the ellipticity and the elliptical polarization orientation of the respective beam are approximately at a minimum, thereby substantially eliminating any portion of light that undergoes polarization rotation by said color splitter.

39. A system as recited in claim 38, further comprising a light source for providing light to the polarizer.

40. A system as recited in claim 38, wherein the light has wavelength ranges and wherein the system further comprises a notch filter for tuning the wavelength ranges of the light such that the light entering the color splitter has selected wavelength ranges.

41. A system as recited in claim 38, wherein the light has wavelength ranges and wherein the system further comprises a notch filter for tuning the wavelength ranges of the light to reflect incidental light with substantially non-constant phase retardance and substantially transmits light having a substantially constant phase retardance such that the light entering the color splitter has selected wavelength ranges.

42. A system as recited in claim 38, wherein the polarizer is a polarizing beam splitter.

43. A system as recited in claim 38, wherein the polarizer is a polarizing cubic beam splitter.

44. A system as recited in claim 38, wherein the color splitter is a Philips prism having at least one surface with a dichroic coating.

45. A system as recited in claim 38, wherein the color splitter is a Philips prism having at least one surface with a dichroic coating with a nonzero phase retardance.

46. A system as recited in claim 38, wherein the color splitting means is a Philips prism having at least one surface with a dichroic coating with a nonzero phase retardance and a substantially constant phase retardance for the wavelength of light encountering the dichroic coating.

47. A system as recited in claim 38, wherein the color splitter is selected from the group consisting of beamsplitter cubes, X-prisms, L-prisms, and flat tilted plate dichroic mirrors.

48. A system as recited in claim 38, wherein the three reflective imagers are three liquid crystal light valves.

49. A system as recited in claim 38, wherein the waveplate compensator is formed from a birefringent material selected from the group consisting of quartz, calcite, mica, organic polymeric plastics having different indices of refraction for different crystallographic axes, and a liquid crystal cell.

50. A system as recited in claim 38, wherein the at least one waveplate compensator is coupled to the color splitter.

51. A system as recited in claim 38, wherein the at least one waveplate compensator means is coupled to the imagers.

52. A system as recited in claim 38, wherein the at least one waveplate compensator sufficiently eliminates any portion of light that undergoes polarization rotation by said color splitter such that the resulting contrast ratio of said reflective imaging system is at least about an order of magnitude greater than a contrast ratio of a reflective imaging system such as said reflective imaging system without polarization correction means.

53. A system as recited in claim 38, wherein the at least one waveplate compensator comprises at least two waveplate compensators, and wherein each waveplate compensator has a wave value specifically determined in relation to the respective beam received by each waveplate compensator.

54. A system as recited in claim 38, wherein said retardance of said at least one waveplate compensator is selected based on polarization vector modifying characteristics of said color splitter.

55. A system as recited in claim 38, wherein said retardance of said at least one waveplate compensator is selected based on polarization vector modifying characteristics of said polarizer and said color splitter.

56. A system as recited in claim 38, further comprising a convergent light source, wherein said retardance of said at least one wave compensating means is selected based on polarization vector modifying characteristics of said convergent light source, said polarizer and said color splitter.

57. A system as recited in claim 38, wherein the polarizer and the color splitter impart a dispersion in retardance, and wherein the at least one waveplate compensator has a dispersion in retardance substantially equal to the dispersion in phase retardance imparted by the polarizer and the color splitter.

58. A system as recited in claim 38, wherein said first polarized component of light comprises a plurality of skew rays each having a first polarization vector, the skew rays having been directionally modified by said polarizer, and wherein the at least one waveplate compensator modifies the polarization state of the skew rays passing therethrough, such that a second component of light having a second polarization state enters into the color splitter with each skew ray having a second polarization vector substantially orthogonal to the first polarization vector of the respective skew ray.

59. A method of manufacturing a waveplate compensator for use in an image projection system which utilizes color splitting means for separating a polarized component of light into at least two separate color beams, the method comprising:

identifying a desired retardance value at which an approximate minimum occurs for both ellipticity and elliptical polarization orientation of light as caused by polarization rotation of a portion of the light by a color splitting means in an image projection system, and providing a waveplate compensator having a retardance value which corresponds with the desired retardance value identified as resulting in an approximate minimum for both the ellipticity and elliptical polarization orientation of the light.

60. A method as recited in claim 59, wherein said identifying step is achieved by calculating the ellipticity and elliptical polarization orientation.

61. A method as recited in claim 59, wherein said identifying step is achieved by measuring properties related to the ellipticity and elliptical polarization orientation and then calculating the ellipticity and elliptical polarization orientation based on the measured properties.

62. A method as recited in claim 59, wherein said providing step is achieved by selecting a type of birefringent material to be used as the waveplate compensator, identifying an approximate thickness of the selected type of birefringent material which yields a retardance value corresponding with the desired retardance value, and providing the selected type of birefringent material with the identified thickness and in sizes appropriate for use as a waveplate compensator.

63. A method of manufacturing a waveplate compensator for use in an image projection system which utilizes color splitting means for separating a polarized component of light into at least two separate color beams, the method comprising:

determining values, at retardance value intervals, for both ellipticity and elliptical polarization orientation of light as caused by polarization rotation of a portion of the light by a color splitting means in an image projection system, identifying a desired retardance value at which an approximate minimum occurs for both the ellipticity and the elliptical polarization orientation of the light, and providing a waveplate compensator having a retardance value which corresponds with the retardance value identified as resulting in an approximate minimum for both the ellipticity and elliptical polarization orientation of the light, whereby the waveplate compensator may be placed in an optical path between a color splitting means and an imaging means to substantially eliminate any portion of light that undergoes polarization rotation by the color splitting means.

64. A method as recited in claim 63, wherein said retardance value intervals range from 0 to 0.5.

65. A method as recited in claim 63, wherein said determining step is achieved by calculating the ellipticity and elliptical polarization orientation.

66. A method as recited in claim 63, wherein said determining step is achieved by:

determining a pupil size of a cone of light as the light is incident in an image projection system at a location intended for placement of a waveplate compensator, determining a path of at least one ray, calculating the Stokes parameters, and calculating both the ellipticity and elliptical polarization orientation of light at retardance value intervals.

67. A method as recited in claim 63, wherein said determining step is achieved by measuring properties related to the ellipticity and elliptical polarization orientation and then calculating the ellipticity and elliptical polarization orientation based on the measured properties.

68. A method as recited in claim 63, wherein said identifying step is achieved by plotting the determined values of the ellipticity and elliptical polarization orientation.

69. A method as recited in claim 63, wherein said providing step is achieved by selecting a type of birefringent material to be used as the waveplate compensator, identifying an approximate thickness of the selected type of birefringent material which yields a retardance value corresponding with the desired retardance value, and providing the selected type of birefringent material with the identified thickness and in sizes appropriate for use as a waveplate compensator.

70. A method as recited in claim 63, further comprising the step of determining a retardance value which gives the largest integrated contrast through an iterative process by redetermining the ellipticity and elliptical polarization orientation at smaller intervals than the retardance value intervals used in the determining step.

* * * * *

UNITED STATES PATENT AND TRADEMARK OFFICE
CERTIFICATE OF CORRECTION

Page 1 of 2

PATENT NO. : 5,986,815
DATED : Nov. 16, 1999
INVENTOR(S) : Brett Bryars

It is certified that error appears in the above-identified patent and that said Letters Patent is hereby corrected as shown below:

Cover Page, References Cited, please insert the following references:

5,668,664  Shishido
  5,777,673  Yoshikawa

Cover Page, Abstract, line 15, change "increase$" to --increasing--

Col. 1, line 58, change "(100%/2%=50:1." to --(100%/2%=50:1).--

Col. 2, line 58, after "tilted" change "surface" to --surfaces--

Col. 8, line 4, after "700" change "run" to --nm--

Col. 9, line 49, after "is in" insert --the--

Col. 11, line 57, change "tug" to --tuning--

Col. 12, line 62, after "Philips" delete "Is"

Col. 14, line 11, change "An" to --$\Delta$n--

Col. 14, line 66, after "and" insert --$S_3$--

Col. 15, line 32, before "is" delete "and"

Col. 16, line 65, after "of" delete "the"

Col. 21, line 36, change "280" to --28°--

Col. 22, line 33, change "channels" to --channel's--

UNITED STATES PATENT AND TRADEMARK OFFICE
CERTIFICATE OF CORRECTION

PATENT NO. : 5,986,815
DATED : Nov. 16, 1999
INVENTOR(S) : Brett Bryars

It is certified that error appears in the above-identified patent and that said Letters Patent is hereby corrected as shown below:

Col. 22, line 46, after "ranging" delete "is"

Col. 29, line 24, after "three" change "beam" to --beams--

Signed and Sealed this

Sixth Day of February, 2001

Attest:

Q. TODD DICKINSON

Attesting Officer

Director of Patents and Trademarks